Figure 1:
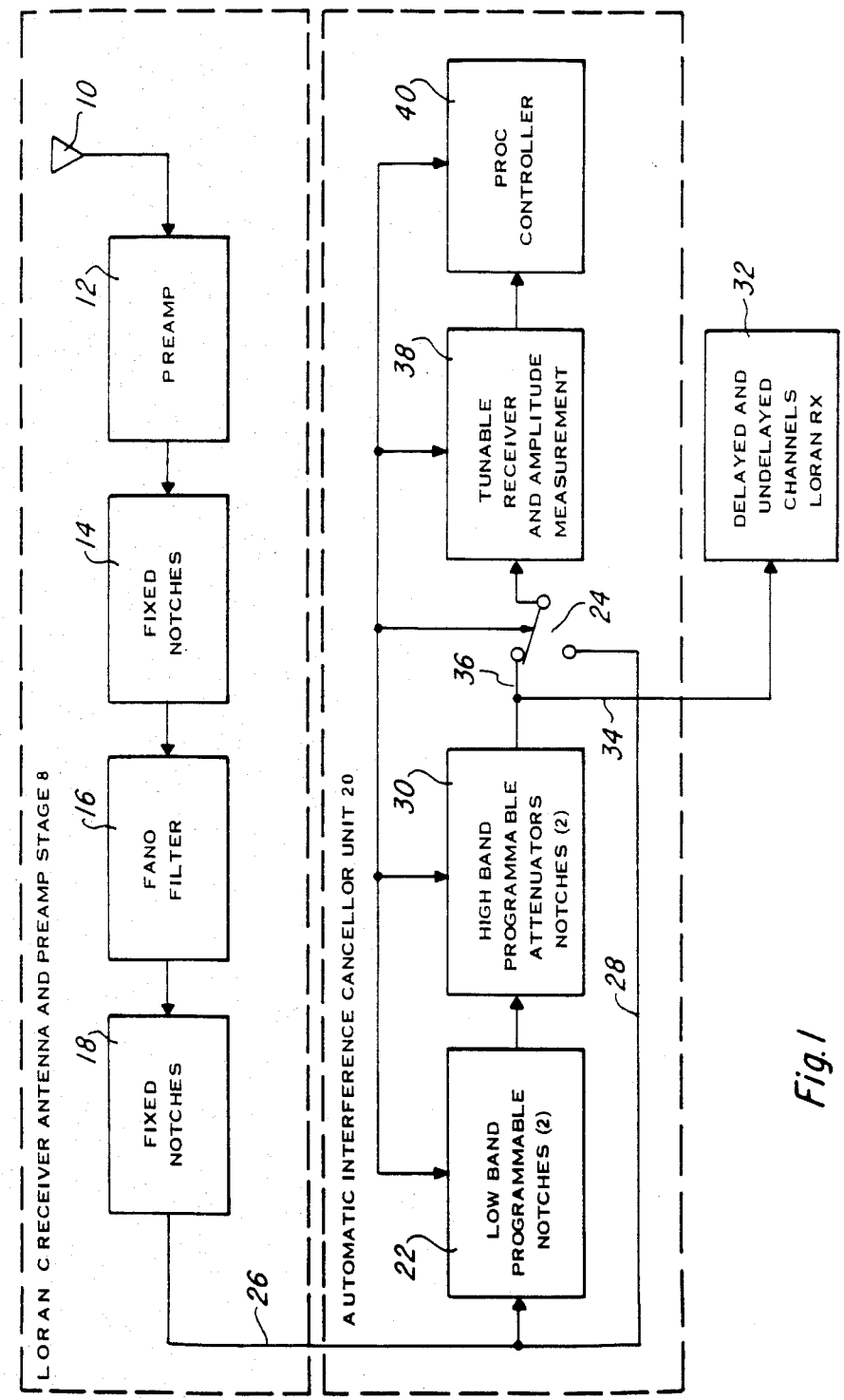

United States Patent [19]

Sharpe et al.

[11] Patent Number: 4,539,566
[45] Date of Patent: Sep. 3, 1985

[54] AUTOMATIC INTERFERENCE CANCELING APPARATUS

[75] Inventors: Claude A. Sharpe, Plano; Cecil C. Ho, Irving, both of Tex.

[73] Assignee: Texas Instruments Incorporated, Dallas, Tex.

[21] Appl. No.: 439,096

[22] Filed: Nov. 4, 1982

[51] Int. Cl.³ .................................................. G01S 1/24
[52] U.S. Cl. .................................. 343/389; 455/306; 343/417
[58] Field of Search ............... 343/389, 417; 455/306, 455/185

[56] References Cited

U.S. PATENT DOCUMENTS

| 4,134,117 | 1/1979 | Robinson et al. ............ 343/389 |
| 4,395,779 | 7/1983 | Fujino et al. ................ 455/306 |
| 4,461,036 | 7/1984 | Williamson et al. ........... 455/185 |

Primary Examiner—Theodore M. Blum
Attorney, Agent, or Firm—Alva H. Bandy; Leo N. Heiting; Melvin Sharp

[57] ABSTRACT

An auto notch system which automatically "notch" filters up to four interference signals (interferers) in the band from 50 KHz to 150 KHz comprises a signal detector, an adjustable notch filter, a bandpass receiver and a digital controller, plus the software that runs in the digital controller. The signal detector circuit has an antenna, a preamplifier and a group of "fixed" filters. The adjustable notch filters are four circuits, each includes an active notch type filter stage with a DAC (digital to analog converter) in series with the input resistor to allow gain control and another DAC that controls the current through a diode that is optically coupled to a light dependent resistor pair. The light resistor pair is in the filter loop and as the resistance varies the frequency response of the filter changes. Thus the frequency response is controlled by varying the diode current. The bandpass receiver is used to sense and amplify the signal output of the Loran bandpass filter or the signal output of the notch filters under control of the controller. The bandpass receiver is tuned by the controller to one 128 specific frequencies in the range from 50 KHz to 150 KHz. The controller tunes the bandpass receiver, selects its input signal source and controls the gain and frequency characteristics of the notch filters. The software commands these hardware functions.

9 Claims, 38 Drawing Figures

Fig. 0, drawing plan

Fig. 0, cont'd.
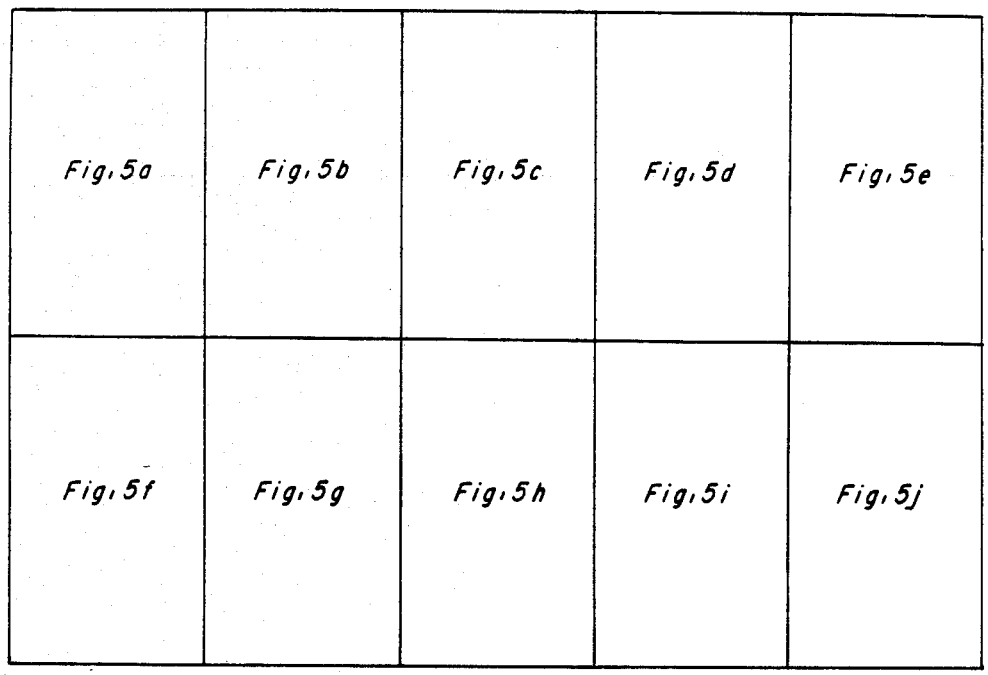
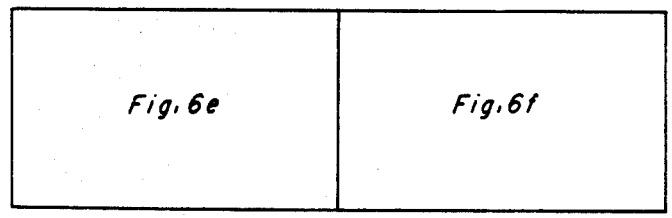
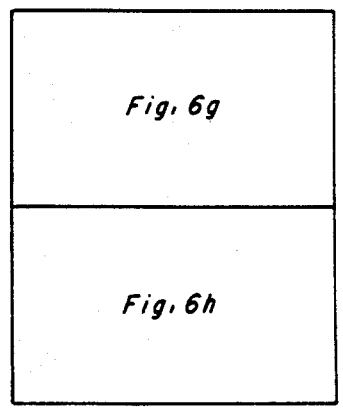

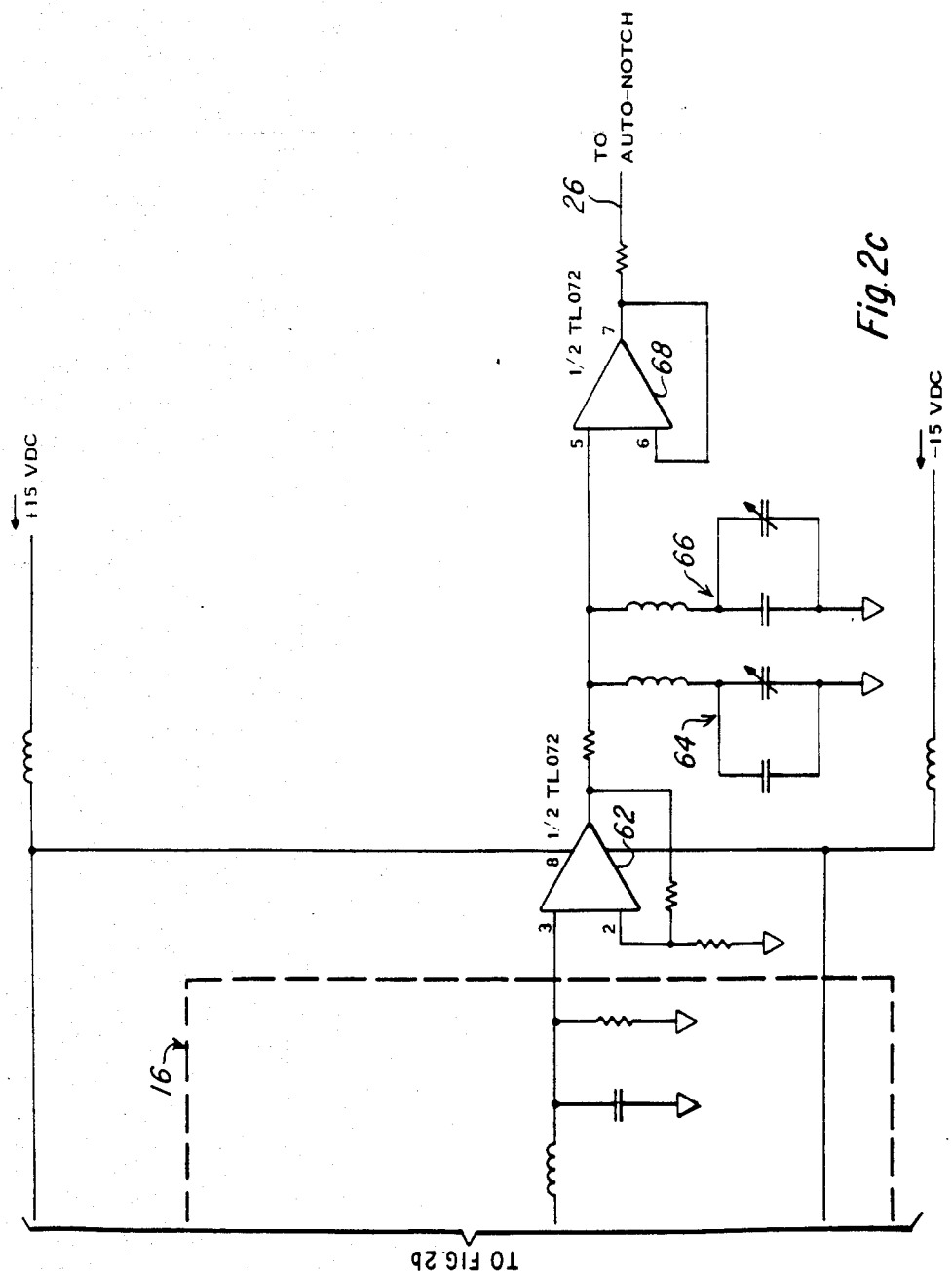

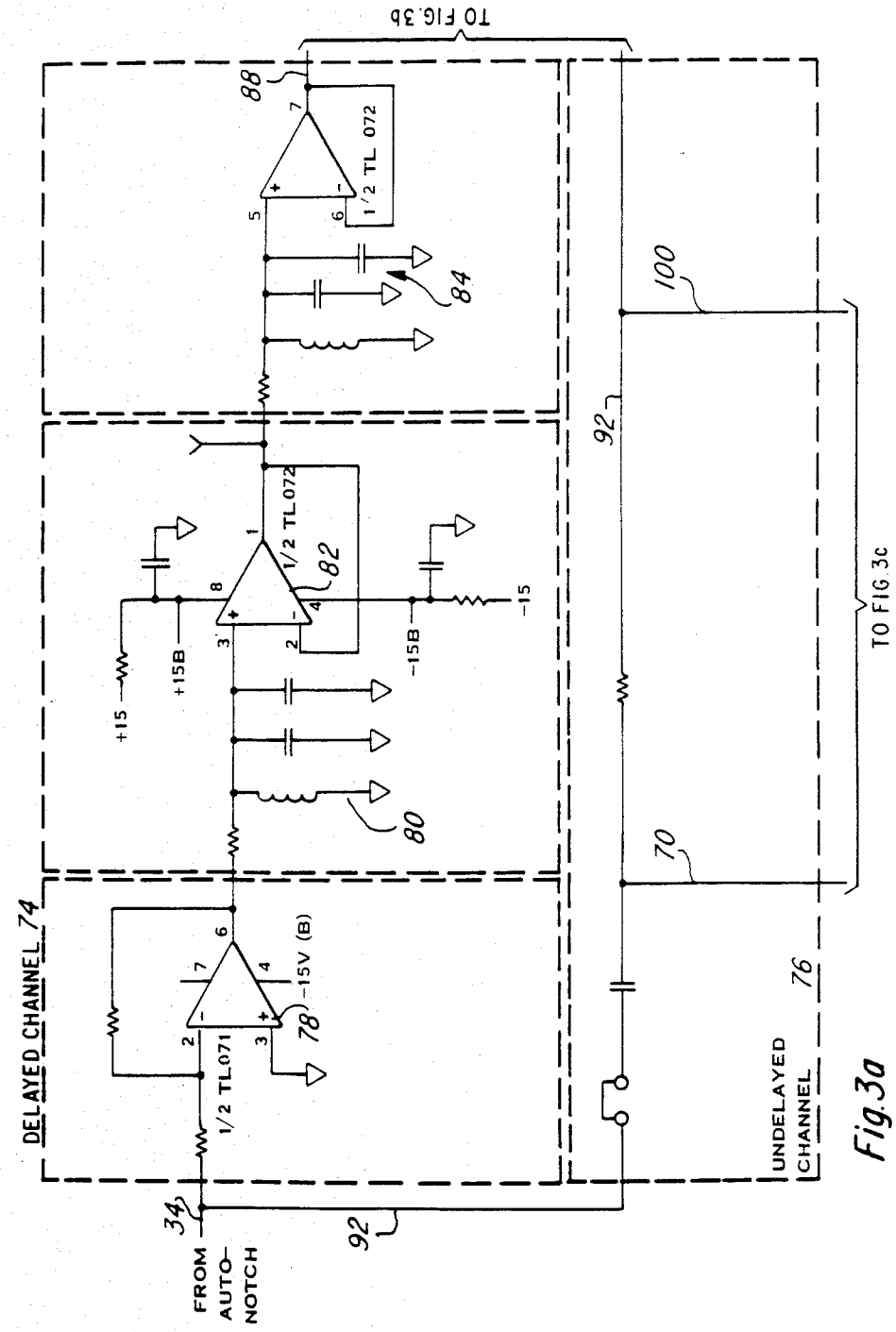

(SWITCH OPEN FOR HIGH LOGIC LEVEL)

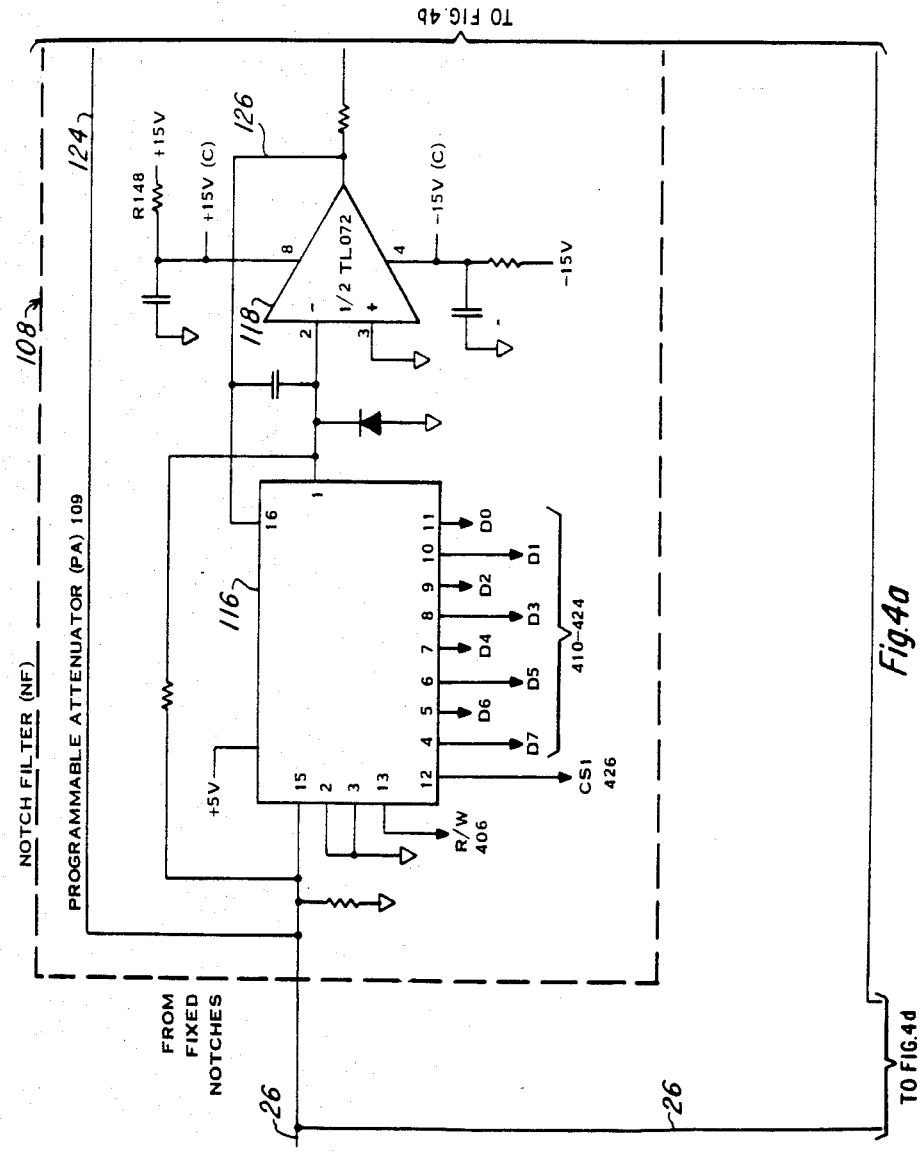

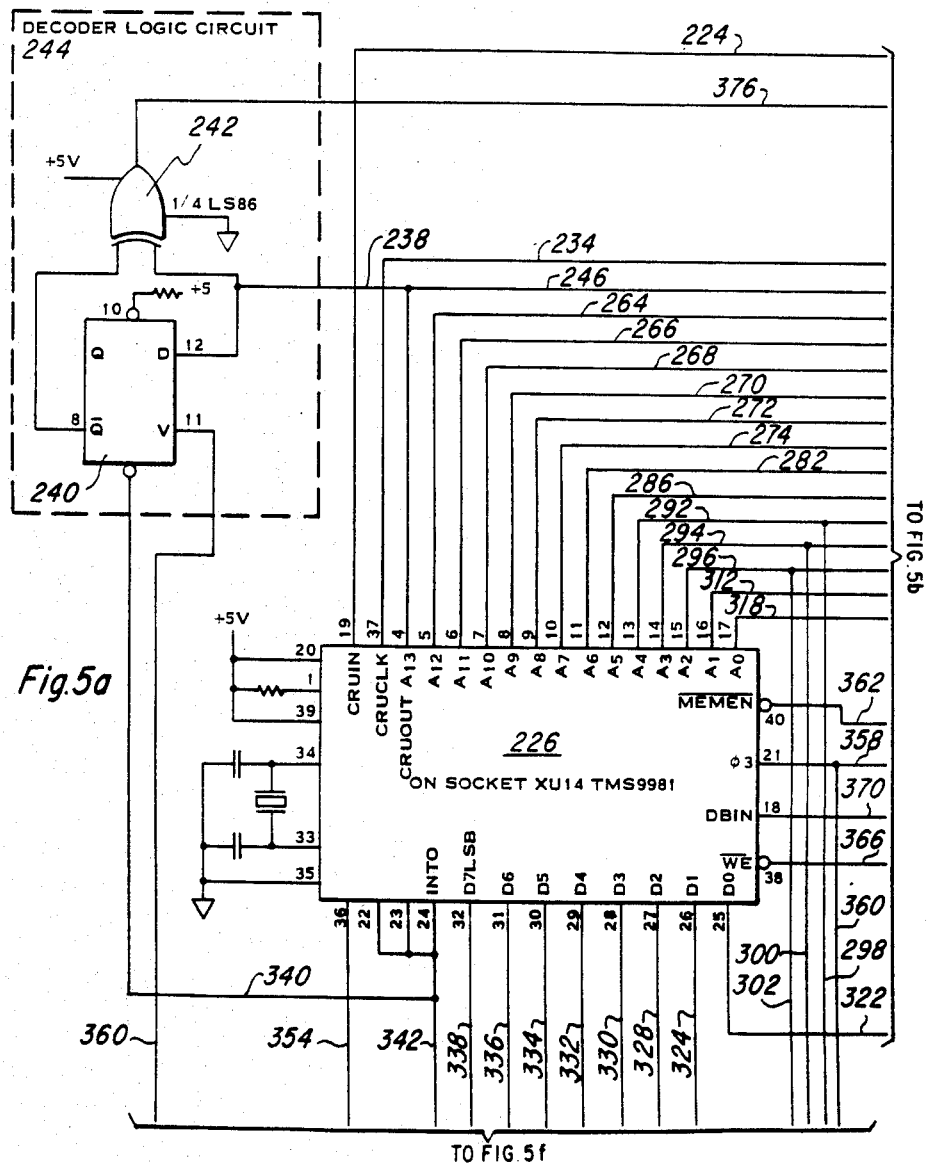

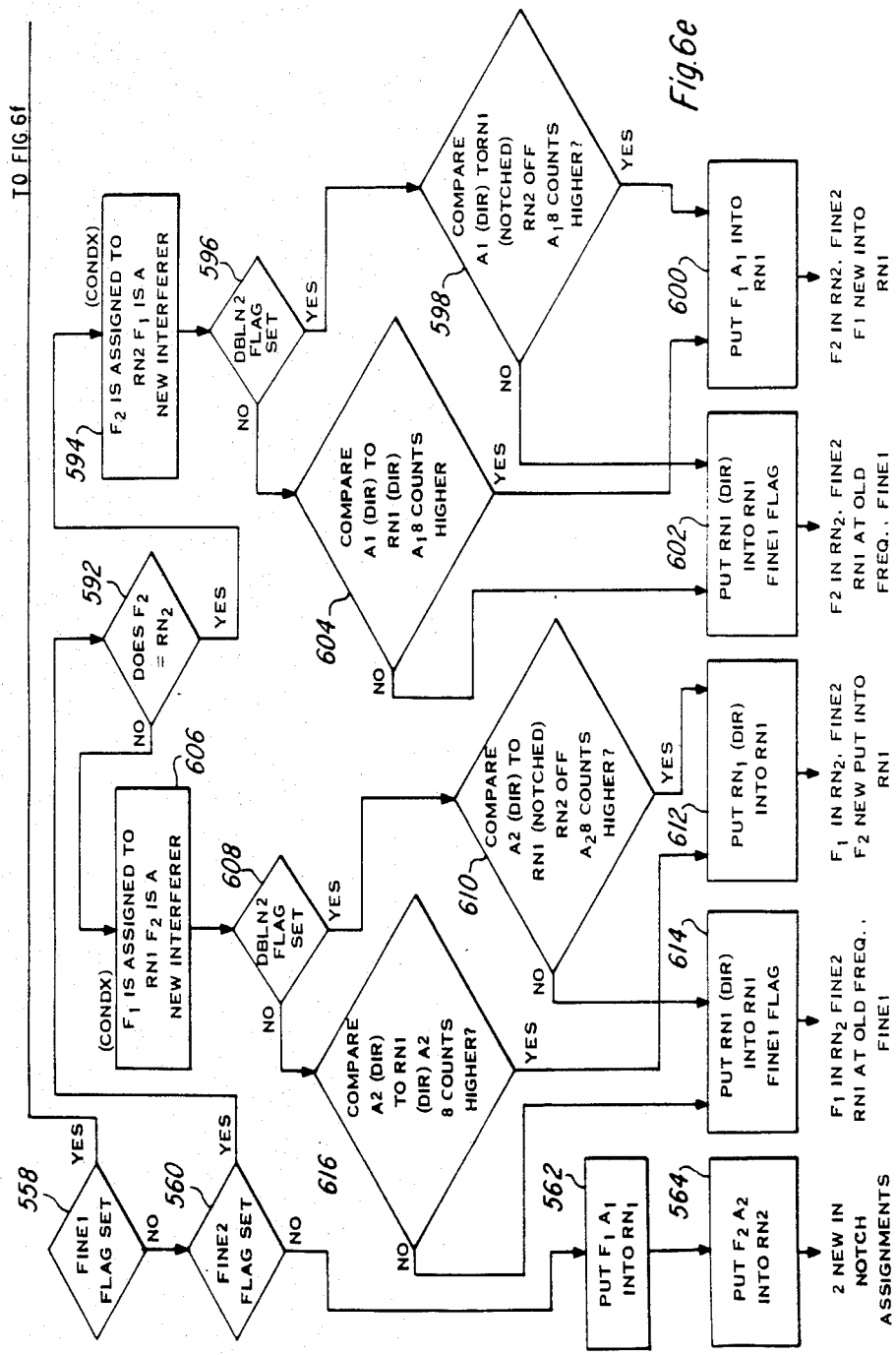

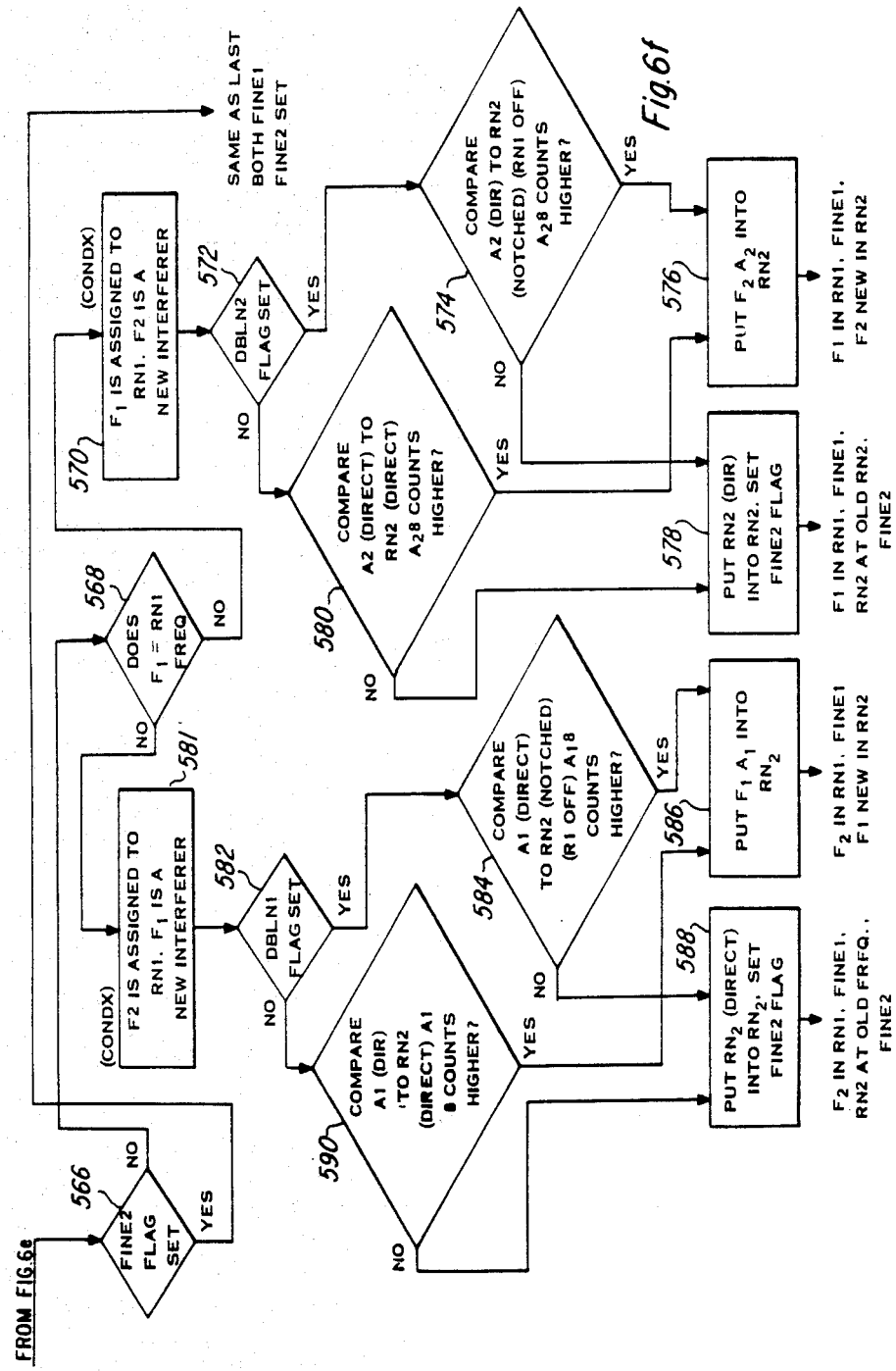

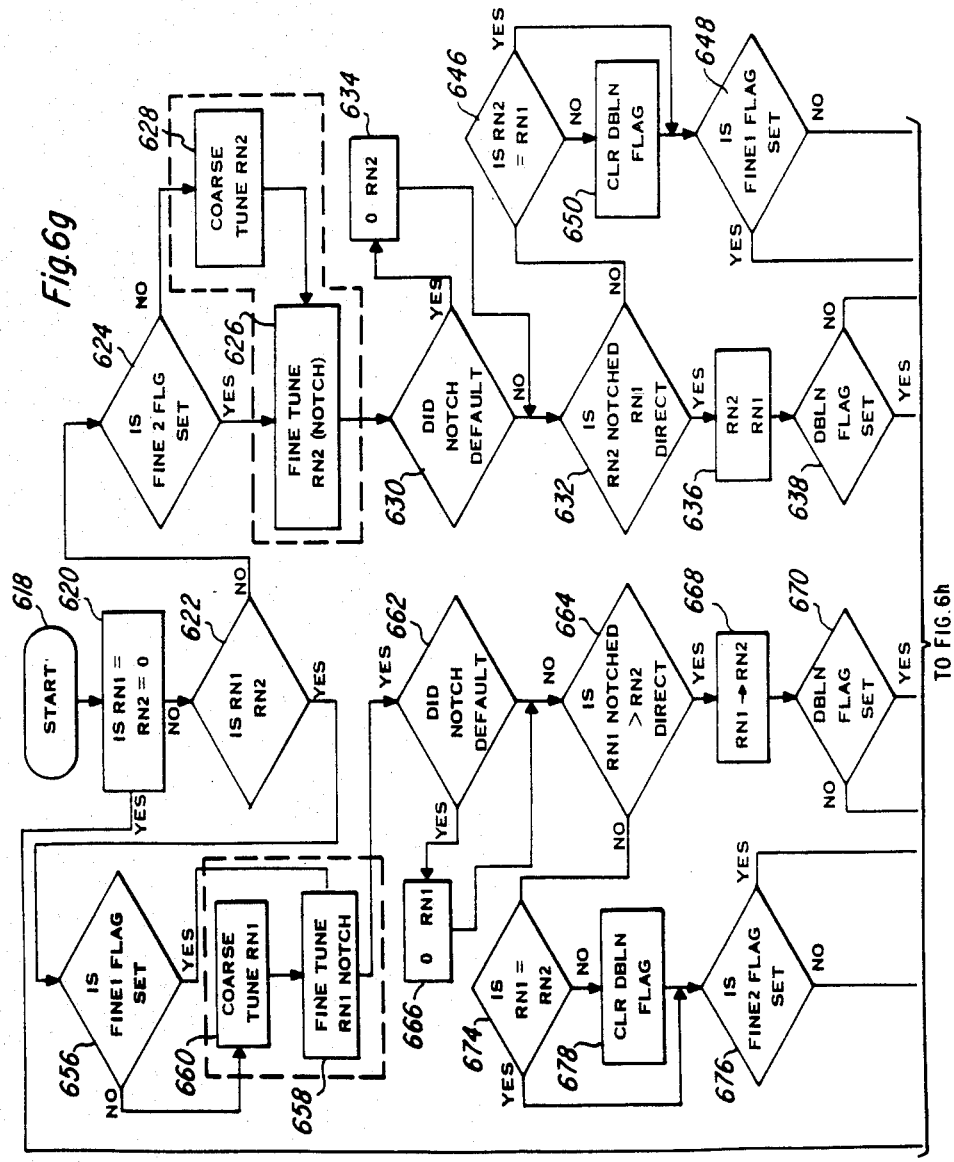

AUTOMATIC INTERFERENCE CANCELING APPARATUS

This invention relates to electrical interference cancelling devices, and more particularly to an automatic electrical interference canceling filter for a LORAN C receiver.

In the past, devices such as receivers, test equipment, and the like have suffered from a wide variation of interference signals which will degrade their performance and in some instances prevent operation entirely. Attempts to overcome this problem have included the use of electrical interference cancelling filters formed as an integral part of the device and controlled by the internal system computer. The disadvantages of existing interference canceling filters are that such integrated filters cannot be used to retrofit existing equipment, are expensive and complex. In addition, they are limited in the number of interferers they can track, their range is limited, and they interfer with the desired signals at times. Further, the internal computer has a slow reaction time and is not capable of excluding continuous wave (CW) on/off key interference.

Accordingly, it is an object of the present invention to provide an automatic interference canceling device which is a stand alone system; that is, a device which can be added to existing equipment and does not require information from the equipment for operation.

Another object is to provide an automatic interference canceling device capable of tuning and tracking a plurality of interferers in a preselected frequency range.

Still another object is to provide an automatic interference canceling device having high dynamic range.

Yet another object is to provide an automatic interference canceling device which is immune to pulse type signals.

Still another object of the invention is to provide an automatic interference canceling device having improved interferer amplitude measuring capability.

An additional object is to provide an automatic interference cancelling device capable of operation in the presence of continuous wave on/off key interference (Morse Code).

Briefly stated the invention comprises filter means for electronic devices such as radio receivers and test sets for filtering out interferers below and above a preselected bandwidth, the filter means includes means for tuning the notches for acquiring high dynamic range, and a detector means for reducing substantially the detection of pulse type signals in a preselected bandwidth, and a digital processing means for detecting and measuring the amplitude of interferers while in the presence of continuous wave on/off key.

Figure 3B:
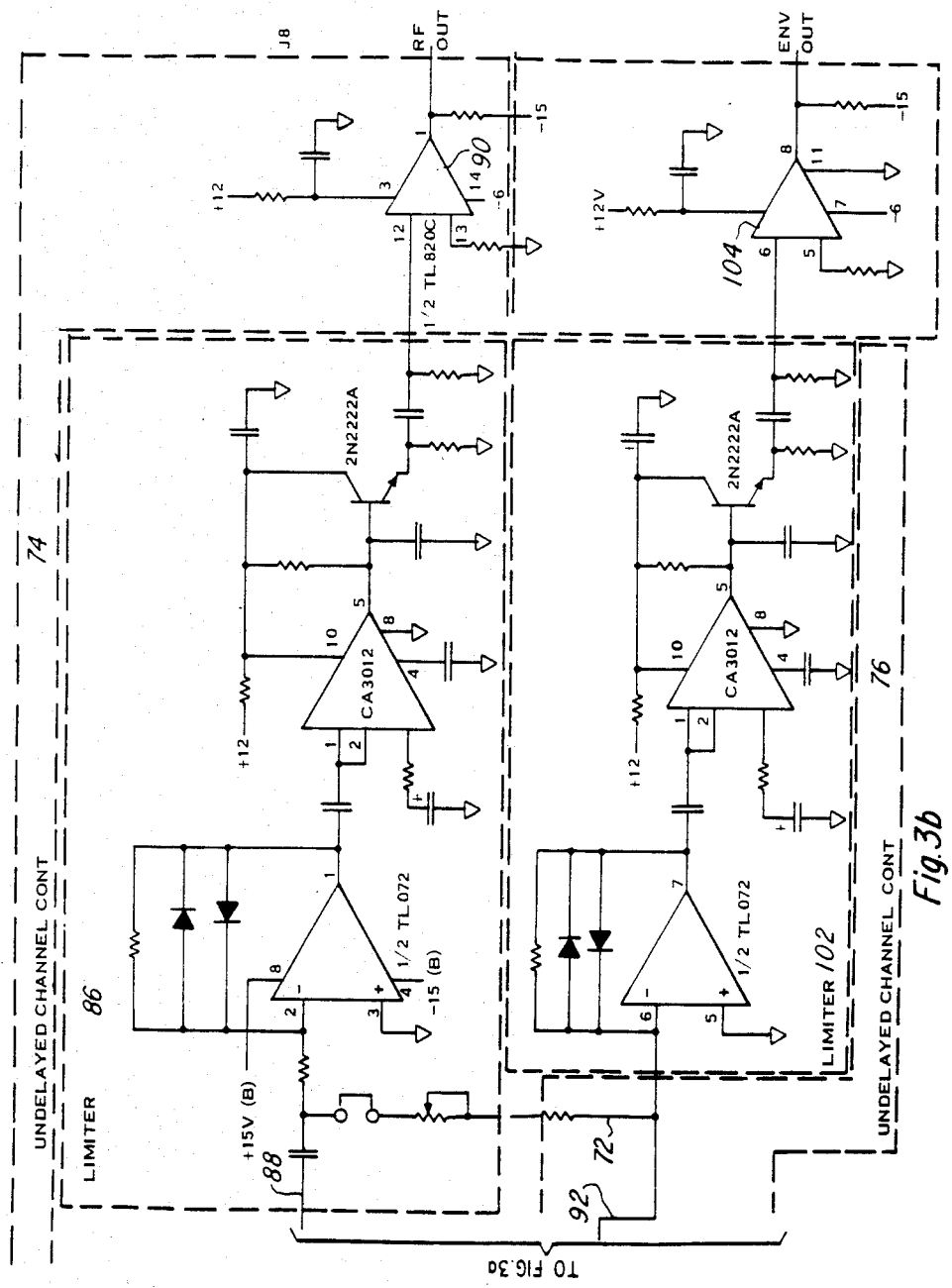
Figure 3C:
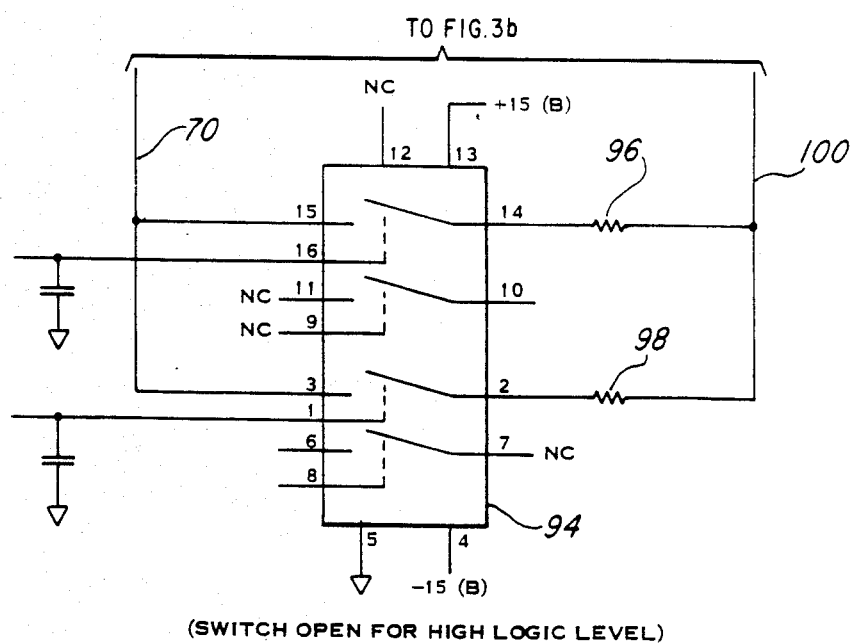

Other objects and features of the invention will become more readily apparent from the following detailed description when read in conjunction with the accompanying drawings, in which like reference numerals designate like parts throughout the figures thereof and in which FIG. 0 is a block diagram showing the arrangement of the figures;

FIG. 1 is a block diagram of a LORAN C receiver including an embodiment of the automatic interference canceling apparatus;

FIGS. 2a-2f constitute a schematic diagram of the LORAN C receiver circuitry leading to the automatic interference canceling apparatus;

FIGS. 3a-3c constitute a schematic diagram of the LORAN C receiver circuitry connected to the output of the automatic interference canceling apparatus;

FIGS. 4a-4i constitute a schematic diagram of the automatic interference canceling apparatus; and FIGS. 5a-5j constitute a schematic diagram of the controller for the automatic interference canceling apparatus.

FIGS. 6a-6h are flow diagrams of the software which commands the hardware functions.

For purposes of description only and not by way of limitation the automatic interference canceling means will be described in connection with a LORAN C receiver such as that disclosed in U.S. Pat. No. 4,134,117 issued Jan. 9, 1979 to Eugene A. Robinson et al. Those skilled in the art seeking a more detailed description of the LORAN C receiver are referred to that patent.

Referring now to FIG. 1, the LORAN C receiver with the automatic interference canceling means comprises an antenna and preamplifier stage 8 having an antenna 10 for receiving incoming radio frequency RF signals including LORAN C signals. LORAN C signals have a frequency of about 100 KHz. A preamplifier 12, which is an antenna matching amplifier, amplifies the received signals to a working level. A first set of fixed notch filters 14 is tuned to attenuate, respectively, preselected low and high frequencies or interference signals (hereinafter referred to as interferers) known to be present in the area of operation. A band pass filter 16 is connected to the set of fixed notch filters 14 for transmitting ac currents whose frequencies are between given upper (110 KHz) and lower (90 KHz) cutoff values while substantially attenuating all frequencies outside this band. A second set of fixed notch filters 18 are connected to band pass filter 16 for further attenuation of the known interferers.

An automatic interference canceler unit 20 is connected to the second set of fixed notches 18 for automatically canceling random interferers. The unit may be built into the LORAN C receiver or as a separate unit which may be plugged into the LORAN C receiver. The unit includes a low band filter means 22 and a switch 24 connected, respectively, by leads 26 and 28 to the fixed notch filters 18. The low band filter means 22 is connected to a high band filter means 30. The low band filter means 22 seeks out a preselected number of interferers in a preselected low band for attenuation; while the high band filter means seeks out a preselected number of interferers in a preselected high band for attenuation. For a LORAN C receiver the low band is 50 to 90 KHz and the high band is from 110 to 150 KHz.

The high band filter means 30 is connected to the delayed and undelayed channels of the LORAN C receiver 32 by lead 34 and by lead 36 to switch 24. Thus, switch 24 has one contact connected to the high band filter means 30 and a second contact connected to the fixed notches 18. The pole of the switch 24 is connected to a tuneable receiver and amplitude measuring device 38. The tuneable receiver and amplitude measuring device 38 is for scanning the band and determining the presence of interferers and their amplitudes.

A digital processing means or controller 40 is connected to the tuneable receiver and amplitude measuring device 38, switch 24, and the high and low band filtering means 22 and 30 for controlling their operation.

The operation of the system includes a scanning step and a coarse and fine tune step as follows. With power on the controller 40 switches the switch to connect the tuneable receiver and amplitude measuring device 38 to the set of fixed notches 18 for scanning the band of operation. The controller 40 steps the tuneable receiver and amplitude measuring apparatus 38 through a preselected number of frequency increments of the band. The apparatus 38 determines at each frequency increment information concerning any interferer present including its amplitude and outputs the information to the controller 40. The controller 40 stores the information for each frequency increment and determines, for example, the preselected number (two) strongest interferers in the low band and in the high band.

Then, the controller switches in the programmable low band filter means 22 and the high band filter means 30 and inputs frequency word information concerning the two low band interferers and the two high band interferers. The low band filter means 22 and the high band frequency means converts the digital frequency words into analog signals representative of the frequency word and filters these frequencies from the LORAN C incoming signals. The scanning cycle is repeated periodically, for example, every thirty seconds.

LORAN C CIRCUITRY LEADING TO AUTOMATIC INTERFERER CANCELING UNIT

Figure 2A:
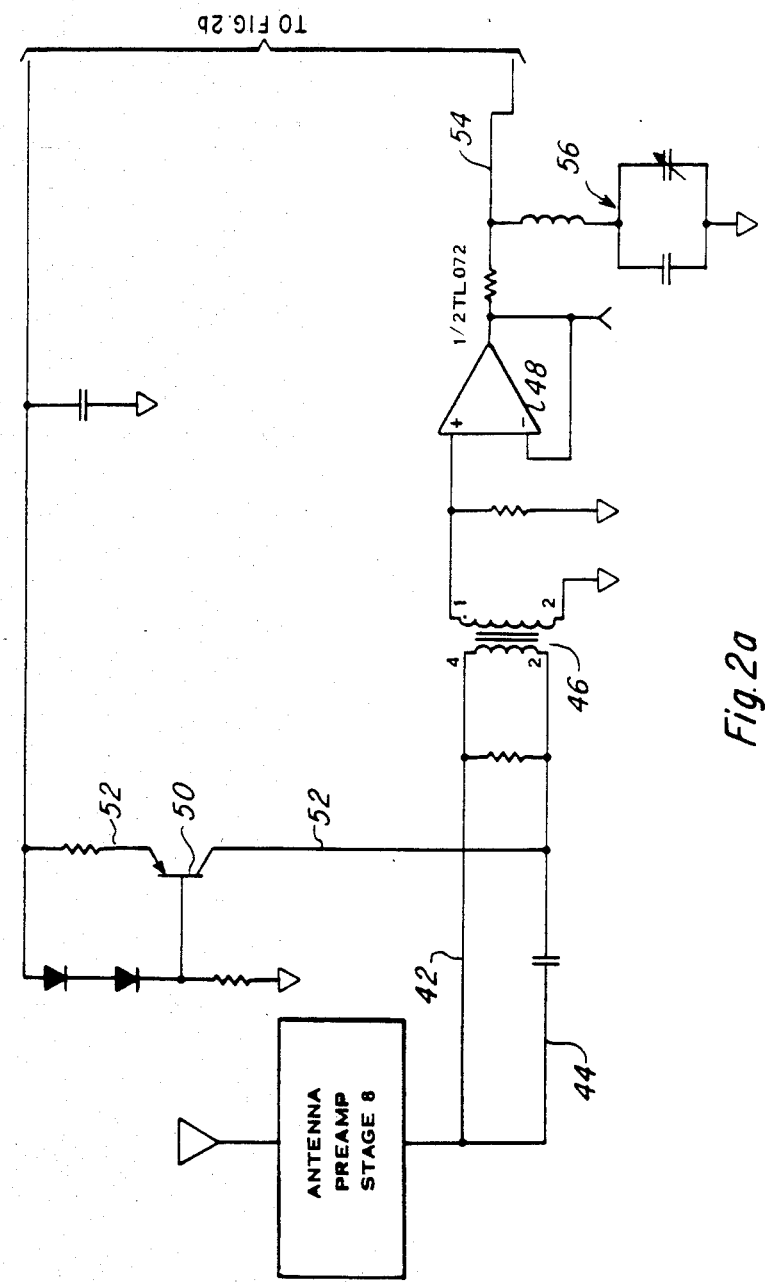
Figure 2B:
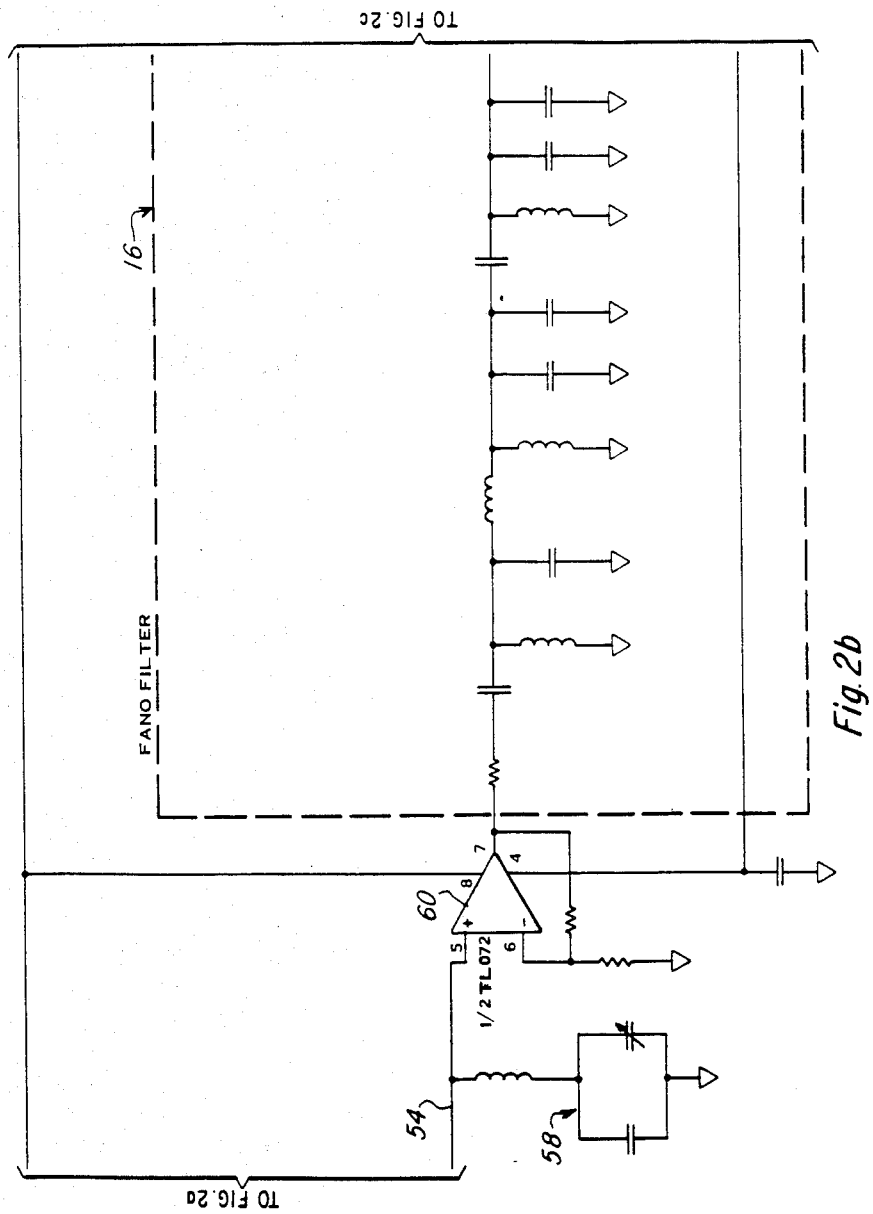

Referring now to FIGS. 2a-2c for a more detailed description of that portion of the LORAN C receiver leading to the automatic interferer canceling means. The signals received by the antenna and preamplifier assembly 8 (FIGS. 1 and 2a) are connected to leads 42 and 44 through transformer 46 (FIG. 2a) to amplifier 48 for amplification to a working level. A transistor 50 is connected by lead 52 to a source of power and to lead 44 to provide a dc voltage for the preamplifier assembly thereby alleviating any current loader effect. Amplifier 48 is connected by lead 54 to a first pair of fixed low-/high notch filters 56 (FIG. 2a) and 58 (FIG. 2b) which constitute the first fixed notch filter 14 (FIG. 1).

Fixed notch filters 56 and 58 attenuate, respectively, preselected low and high frequencies (interferers) known to be present in the geographic area of operation. The attenuation is about 15 db. An amplifier 60 is connected to notch filter 58 to restore the working level of the remaining incoming signals.

The band pass filters 16 (FIG. 1) is, for example, a Fano filter 16 (FIGS. 1, 2b and 2c) connected to amplifier 60. The Fano filter 16 has a preselected bandpass for transmitting ac currents whose frequencies are between given upper (110 KHz) and lower (90 KHz) cutoff values while substantially attenuating all frequencies outside this band. The filter is named after its inventor, is well known and therefore is not described in detail.

The working level of the remaining input signals is restored by amplifier 62 (FIG. 2c) which is connected to the output of Fano filter 16. A second pair of fixed low/high notch filters 64 and 66, constituting the fixed notch filter 18 (FIG. 1), are connected to amplifier 62 (FIG. 2c) for further attenuation of the remaining incoming signals. The fixed notch filters 64 and 65 further attenuate the known fixed high/low frequencies about another 15 db. Amplifier 68 is connected to fixed notch filter 66 to restore the working level of the remaining incoming signals. Amplifier 68 is connected by lead 26 to the automatic interferer canceller unit 20 (FIG. 1). The automatic interferer canceller unit 20, which will be described in detail hereinafter, has its interferer free output connected by lead 34 (FIGS. 1 and 3a) to the remaining LORAN C receive circuit (32).

LORAN C CIRCUITRY ATTACHED TO AUTOMATIC INTERFERENCE CANCELER UNIT

Referring now to FIGS. 3a–3c, lead 34 (FIG. 3a) is connected to the junction of a delayed channel 74 and an undelayed channel 76. Delayed channel 74 includes an inverter 78 connected by lead 34 to the automatic interferer canceling unit 20 (FIG. 1) for inverting the phase of the LORAN C signal. A first fixed bandpass filter 80 is connected to the inverter for delaying the inverted signal a preselected amount. Operational amplifier 82 provides unitary gain to the delayed signal. A second fixed bandpass filter 84 provides a further delay to the delayed signal of fixed bandpass filter 80. A limiter 86 (FIG. 3b) is connected by lead 88 to the bandpass filter 84 to square up the LORAN C signals. An amplifier 90 is connected to the limiter 86 to produce RF signals compatible with transistor, transistor logic (T$^2$L) for the LORAN C main computer (not shown).

The undelayed channel 76 (FIGS. 3a–3c) is connected by lead 92 to lead 34 (FIG. 3a) to the automatic interferer canceler unit 20 (FIG. 1). A switch 94 (FIG. 3c) has contacts pins 15 and 3 which are controlled by the master computer (not shown) and connected by lead 70 to lead 92 (FIG. 3a) and poles (pins 14 and 2) (FIG. 3c) connected to resistors 96 and 98. These resistors 96 and 98 are connected by lead 100 to lead 92 (FIG. 3a). The computer controls switch 94 to add additional resistance to lead 92 for a purpose hereinafter stated.

Lead 92 (FIG. 3b) is connected by lead 72 to the junction of the bandpass filter 84 (FIGS. 3a and 3b) of the delayed channel 74 and limiter 102 (FIG. 3b) where the inverted time delayed LORAN C signals are summed with the non-inverted, undelayed LORAN C signals to produce a phase reversal at a preselected cycle. The position of the phase reversal is fine tuned by the computer controlled additional resistance of the above mentioned resistors 96 and 98 (FIG. 3c). The limiter 102 reduces the sinusoidal LORAN C signals to square waves. An amplifier 104 is connected to the limiter 102 to make the LORAN C signals T$^2$L compatible for the master computer (not shown).

The digitized output of the delayed channel and the undelayed channel are connected to selected latches of the RF unit data latches and multiplexer of the LORAN C master computer.

The LORAN C master computer processes the digitized RF and envelope signals for GRI searching and coarse envelope and cycle identification of the master and slave signals which are synchronously sampled to determine the presence of LORAN C signals having specific GRI, coarse envelope, phase lock loop and zero phase crossings for cycle identification. A keyboard is used by an operator to operate the receiver through a display control to obtain information pertinent to the position of the LORAN C carrier for display. As the main computer is independent of the operation of the automatic interferer canceling unit a detalied description of the LORAN C controller is not included. It will be appreciated that the main computer can be used when the automatic interferer canceling unit is made an integral part of the LORAN C receiver. Those persons skilled in the art are referred to the above-mentioned U.S. Pat. No. 4,134,117 for a detailed description of the master computer.

AUTOMATIC INTERFERER CANCELING UNIT

The automatic interference cancelling unit includes the programmable notches (FIGS. 1, and 4a–4f) for the low bandpass filters 22 and for the high bandpass filters 30 (FIG. 1), the tuneable receiver and amplitude measuring circuit 38 (FIGS. 1 and 4g–4i) and the interferer canceling controller 40 (FIGS. 1 and 5a–5j).

PROGRAMMABLE ATTENUATORS

Notch filters 108 and 110 (FIGS. 4a–4c) constitute the low band filters 22 and notch filters 112 and 114 (FIGS. 4d–4f) the high band pass filters.

Figure 4B:
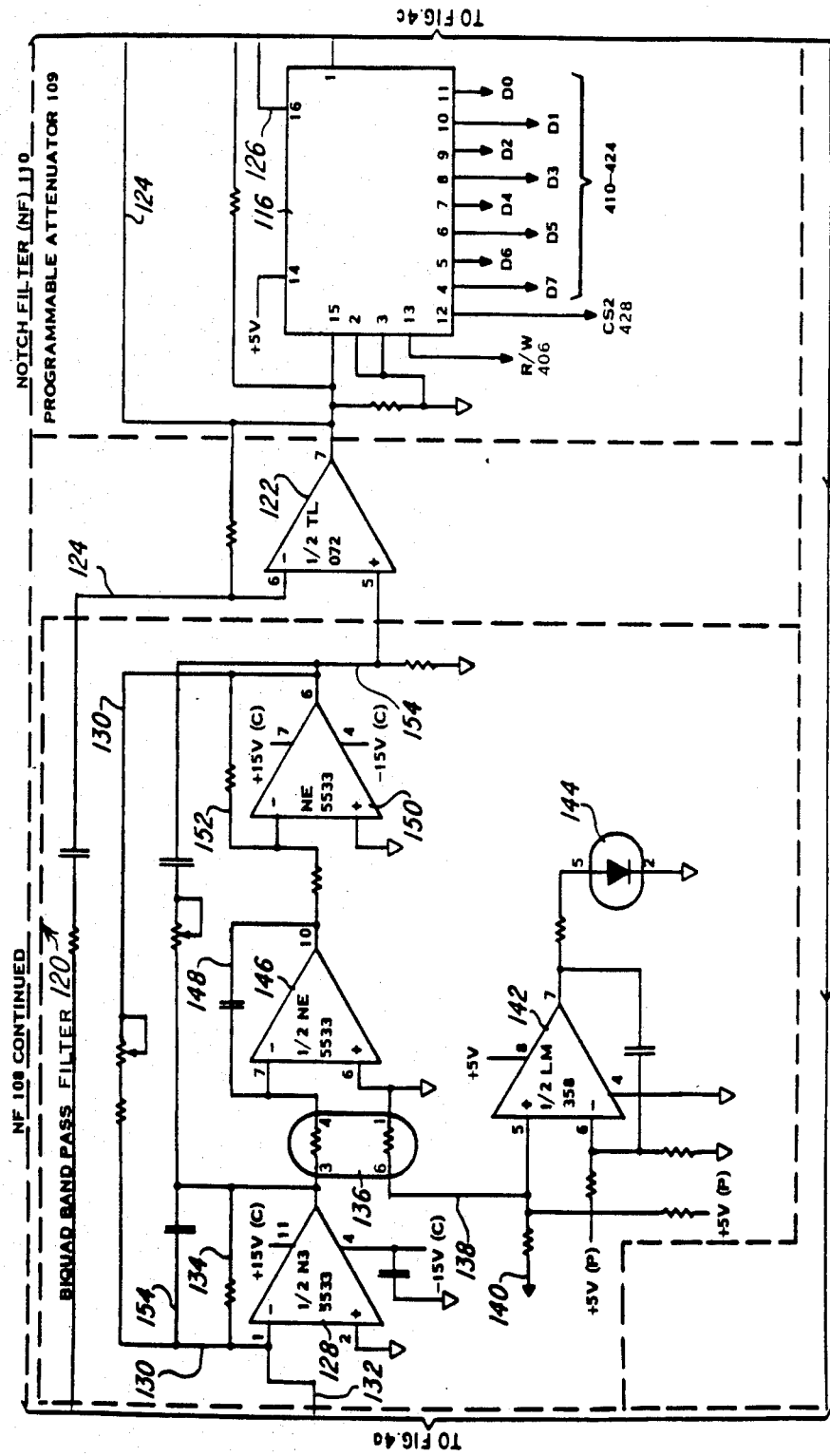
Figure 4C:
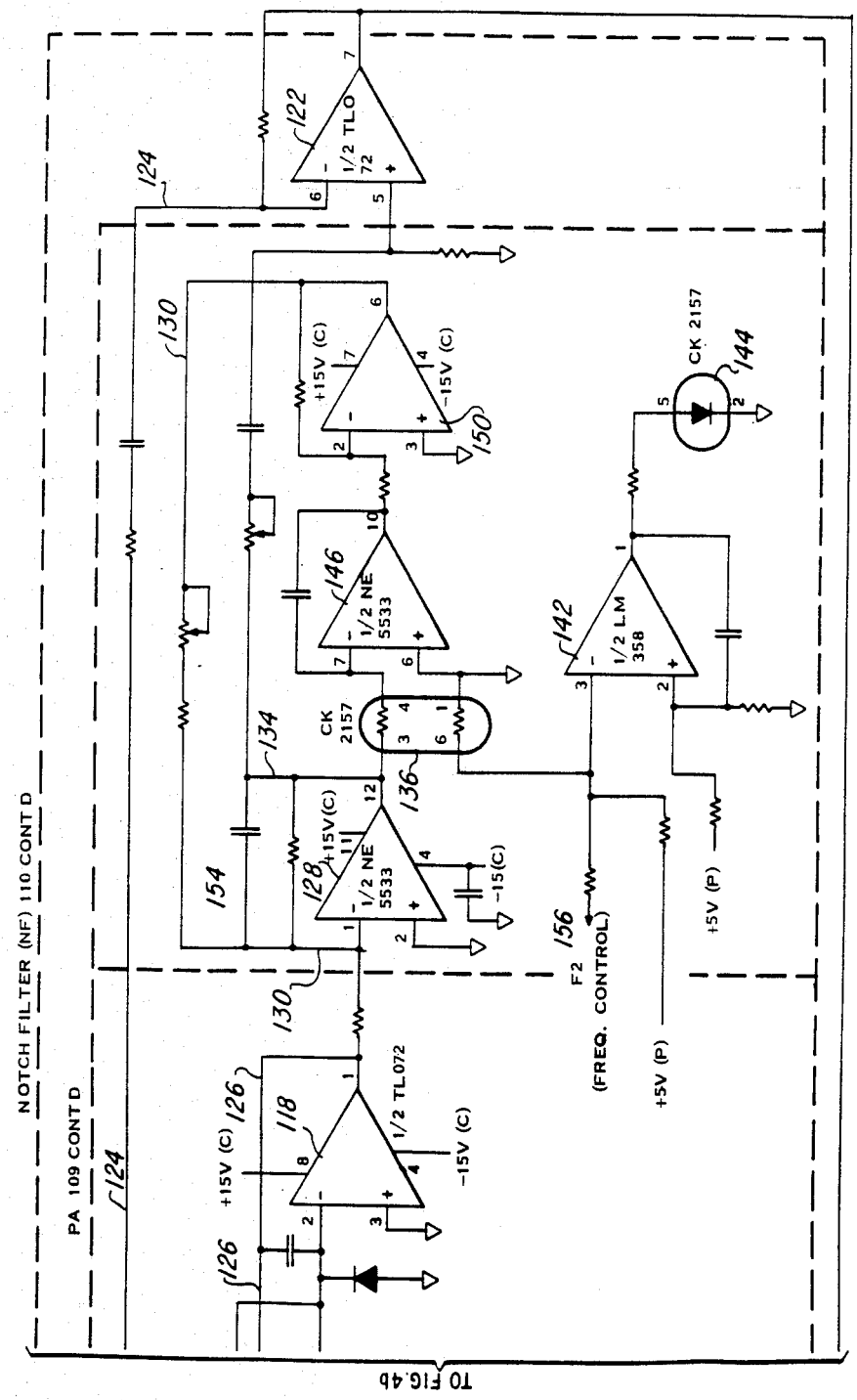
Figure 4D:
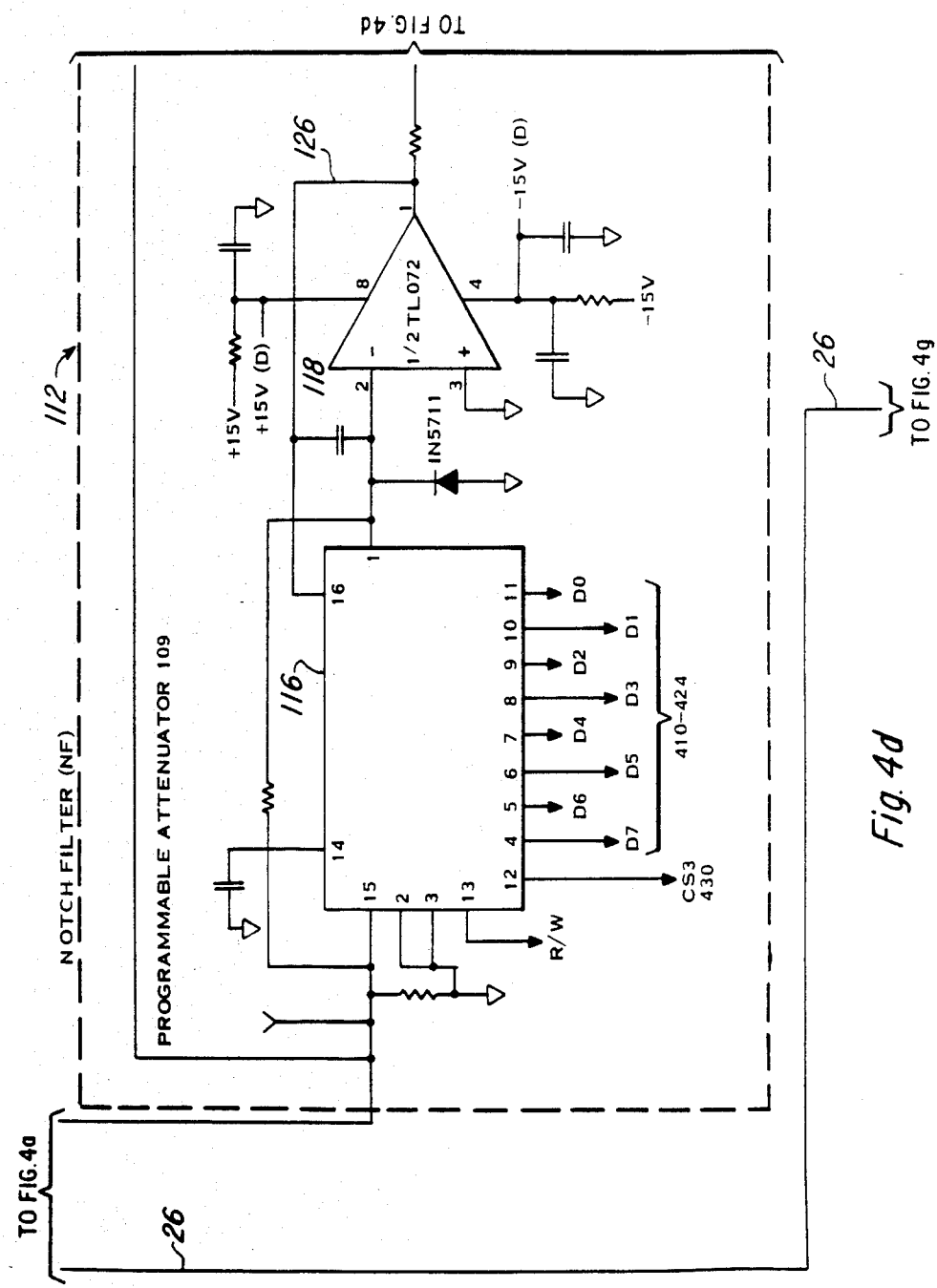
Figure 4E:
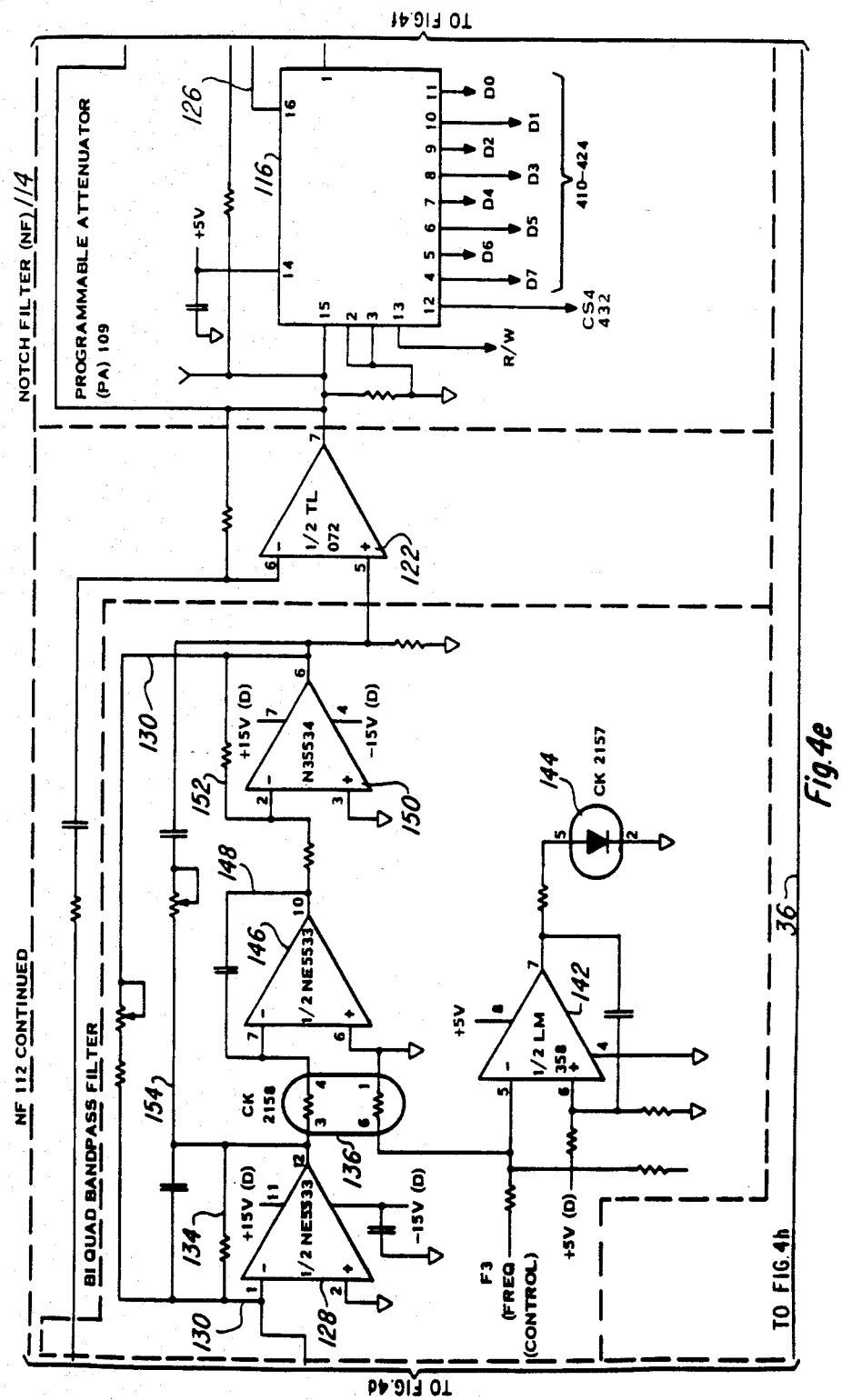
Figure 4F:
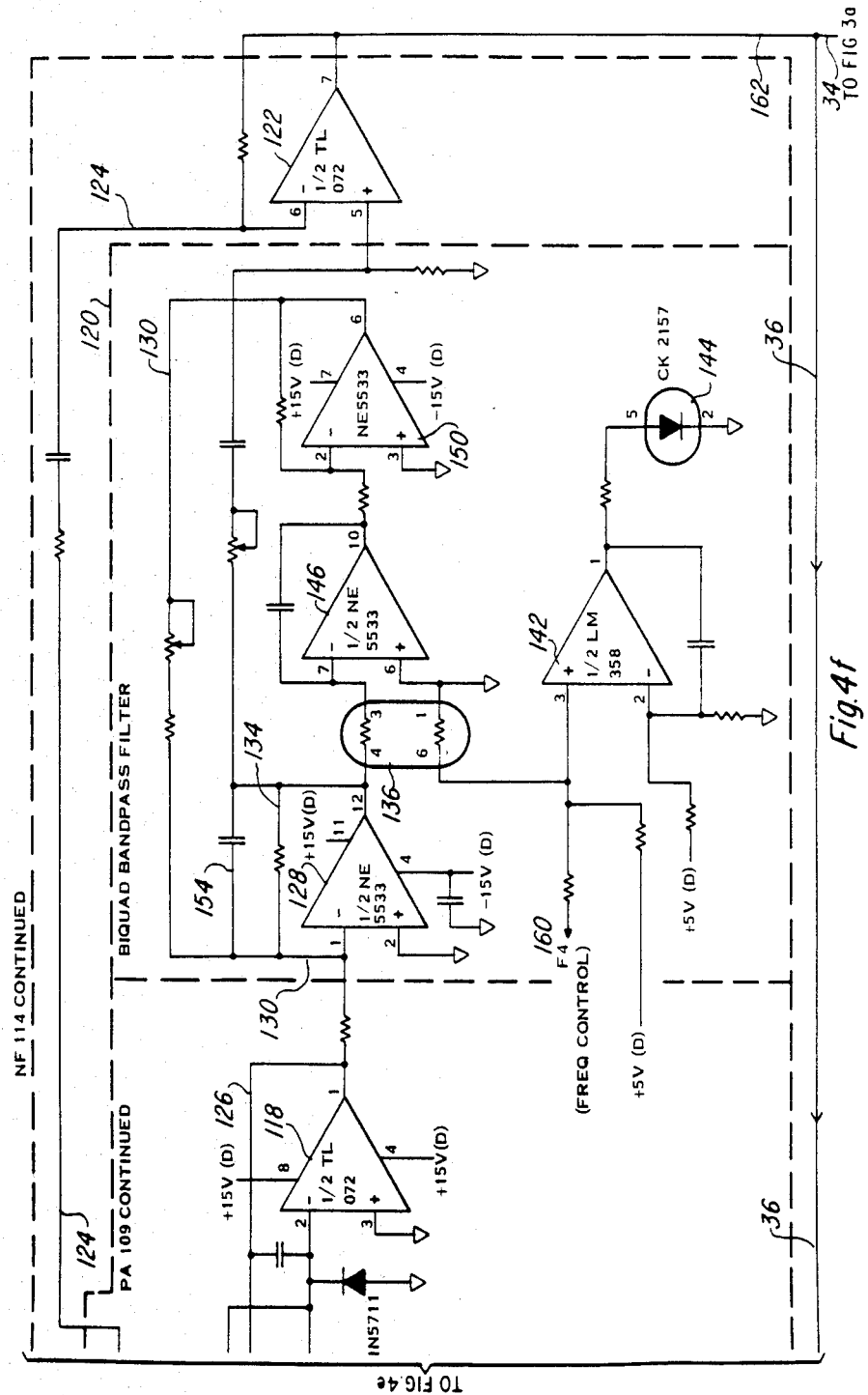

The notch filter 108 (FIG. 4a) is connected to cascade to notch filters 110 (FIGS. 4b and 4c), 112 (FIGS. 4d and 4e), and 114 (FIGS. 4e and 4f).

Each of the notch filters is of the signal bandpass type connected in a nulling configuration, identical in construction and therefore only one notch filter 108 is described in detail.

The notch filter 108 includes a programmable attenuator 109 having a digital to analog converter (DAC) 116 (FIG. 4a), an amplifier 118, a biquad bandpass filter 120 (FIG. 4b) and a summer 122. The amplifier 68 (FIG. 2c) of the fixed notch filters 18 is connected by lead 26 (FIGS. 4a, 4g, 4h) to pin 10 of multiple switch 24 (FIG. 4h) and junction of pin 15 of DAC 116 (FIG. 4a) and lead 124 to the negative terminal of summer 122 (FIG. 4b). DAC 116 has its read/write (R/W) pin, its enable $\overline{CS1}$ pin and data (D0–D7) pins connected, respectively, to leads 406 (FIG. 5e), 426, and 410–424 (FIG. 5j) to the controller 40 (FIG. 1) hereinafter described, its pin 1 connected to amplifier 118, and its pin 16 connected to the DAC amplifier 118 feedback circuit 126. Amplifier 118 in conjunction with DAC 116 forms the programmable attenuator 109.

The biquad bandpass filter 120 (FIG. 4b) includes an operational amplifier 128 having its negative terminal connected to the junction of feedback circuit 130 and lead 132 to amplifier 118 (FIG. 4a). Operational amplifier 128 (FIG. 4b) is connected to the junction of feedback circuit 134 and to pin 3 of the first cell of a twin photocell 136. The first cell of the twin photocell 136 is for controlling the frequency in the biquad bandpass filter. The second cell (pin 6) of the twin photocell is connected by lead 138 to the junction of frequency control F1 lead 140 to DAC amplifier 141 (FIG. 5f) of controller 40 for receiving an analog signal representative of a frequency word generated by the controller for the first low frequency interferer selected by the controller 40 and of positive terminal of amplifier 142. Amplifier 142 is connected to a light emitting diode (LED) 144. The light from LED 144 controls the photocells of the twin photocell 136 and permits high voltage swings without distortion.

A comparator 146 has its negative terminal connected to the junction of pin 4 of the first cell of twin photocell 136 and feedback circuit 148 and its positive terminal connected to pin 1 of the second cell and to ground. An operational amplifier 150 has its negative terminal connected to the junction of feedback circuit 152 and comparator 146. The output pin 6 of operational amplifier 150 is connected to the junction of lead 130 to the operational amplifier 128 and of lead 154. Lead 154 is connected to the positive pin 5 of summer 122, which as previously stated has its negative pin 6 connected by lead 124 to the LORAN C receiver input to the notch filter 108 (FIG. 4a). The output of notch filter 108 is the LORAN C receiver input with the interferer represented by the frequency word attenuated.

The limiting factor of the biquad type filter is the frequency limitations and noise output of the operational amplifiers. The operational amplifiers are, for example, Signetics designated NE5533's and the DAC's are, for example, Analog devices' designated AD7524's. In the example the 50 KHz–150 KHz signal is controlled over a 255/1 range without distortion and with a very low phase shift. The programmable attenuators 109 provide plus or minus 3 db adjust range in 0.03 db steps.

Notch filter 110 (FIGS. 4b and 4c) has its DAC 116 input pin 15, (FIG. 4b) connected to feedback line 124 and summer 122 and its R/$\overline{W}$ pin 12, CS2 pin 12 and D7–D0 pins connected, respectively, by leads 406 (FIG. 5e), 420 and 410–424 (FIG. 5j) to the controller 40 (FIG. 1) and its frequency control signal input F2 (FIG. 4c) for the second cell of twin photocell 136 and amplifier 142 connected by lead 156 to DAC amplifier 157 (FIG. 5g) of controller 40.

Similarly, notch filter 112 (FIGS. 4d and 4e) and notch filter 114 (FIGS. 4e and 4f) are similarly connected with the exception that their DAC 116 enable (CS3 and CS4) pins 12 (FIGS. 4d and 4e) are connected, respectively, to leads 430 and 432 (FIG. 5j) and their frequency control terminals F3 and F4 are connected, respectively, by leads 158 and 160 to DAC amplifiers 159 and 161 (FIG. 5g) of controller 40.

MULTIPLE SWITCH

Figure 4G:
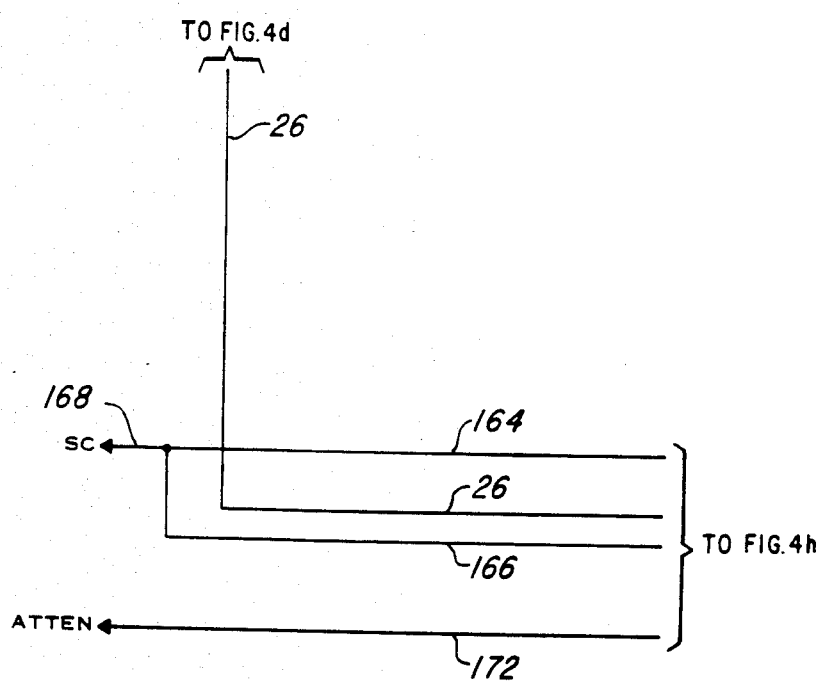
Figure 4H:
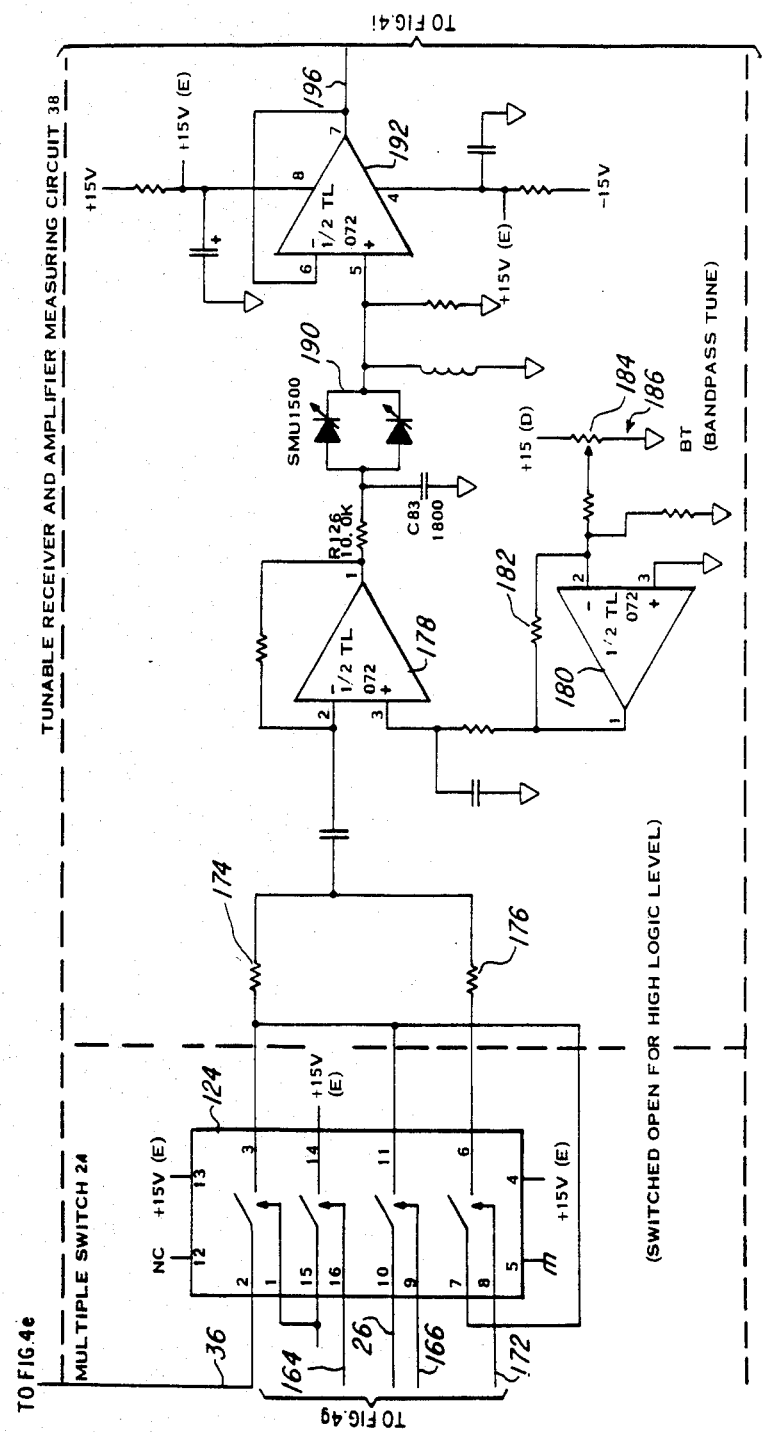

Notch filter 114 (FIG. 4f) is connected by lead 162 to the junction of lead 34 (FIGS. 1 and 3a) to the delayed channel 74 (FIG. 3a) and undelayed channel 76 of the LORAN C receiver 32 (FIG. 1) and lead 36 (FIGS. 1 and 4f, 4e, and 4h) to pin 2 of the multiple switch 24 (FIGS. 1 and 4h).

The multiple switch 24 (FIG. 4h), which may be, for example, a Harris Incorporated HI-201 MOS switch, has pins 16 and 9 connected by leads 164 and 166 (FIGS. 4h and 4g) to lead 168 (FIG. 4g). Lead 168 is connected to the Q6 pin 15 of the output latch 170 (FIG. 5e) of controller 40. Pin 8 (FIG. 4h) of the switch 24 is connected by lead 172 to the receiver attenuator Q7 pin 1 terminal of output latch 170 (FIG. 5e). Multiple switch 24 (FIG. 4h) also has pin 14 connected to a +15 V power source. Thus in operation the multiple switch is controlled by the controller's output latch 170 Q6 and Q7 pins. The multiple switch is open for logic level highs and closed for lows. When a high logic level signal is present at pins 8, 9, and 16, the switches at pins 7, 10, and 15 are open. When the switch 15 is open, pin 1 goes low to close the switch at pin 2 and connect the notch filters through lead 36 to the tuneable receiver and amplitude measuring circuit 38. Conversely, when pins 8, 9, and 16 receive logic lows, the switches at pins 7, 10, and 15 close and the switch at pin 2 opens. Thus, the fixed notches 18 (FIG. 1) output is connected to the tuneable receiver and amplitude measuring circuit 38. The multiple switch has its output pin 3 connected to the junction of resistor 174 and pin 7, its output pin 11 connected to pin 7 and its output pin 6 connected to attenuator resistor 176. Thus, when the amplitude of an interferer exceeds a preselected value, the controller 40 actuates the attenuator switch at pin 7 to add resistor 176 to resistor 174 to increase the resistor and reduce the amplitude of the signals admitted to the negative terminal of comparator 178 of the tuneable receiver and amplitude measuring circuit 38.

TUNEABLE RECEIVER AND AMPLITUDE MEASURING MEANS

The positive terminal of amplifier 178 is connected to the amplifier 180 of a bandpass tune circuit. Amplifier 180 has its negative terminal connected to the junction of a feedback resistor 182, potentiometer 184, and lead 186 (FIGS. 4h, 5j, 5i and 5h) to digital to analog converter (DAC) amplifier 188 (FIG. 5h) of the bandpass frequency tuning voltage output of the digital processor 40 (FIGS. 1 and 5a). A bandpass filter 190, having a frequency, for example, controllable between 50 KHz and 150 KHz, is connected to the amplifier 178. The bandpass filter is tuned with constant gain across the band and scans for interferers throughout the frequency range. Amplifier 192 is connected to the tuned bandpass filter 190 to restore the level of the output.

Figure 4I:
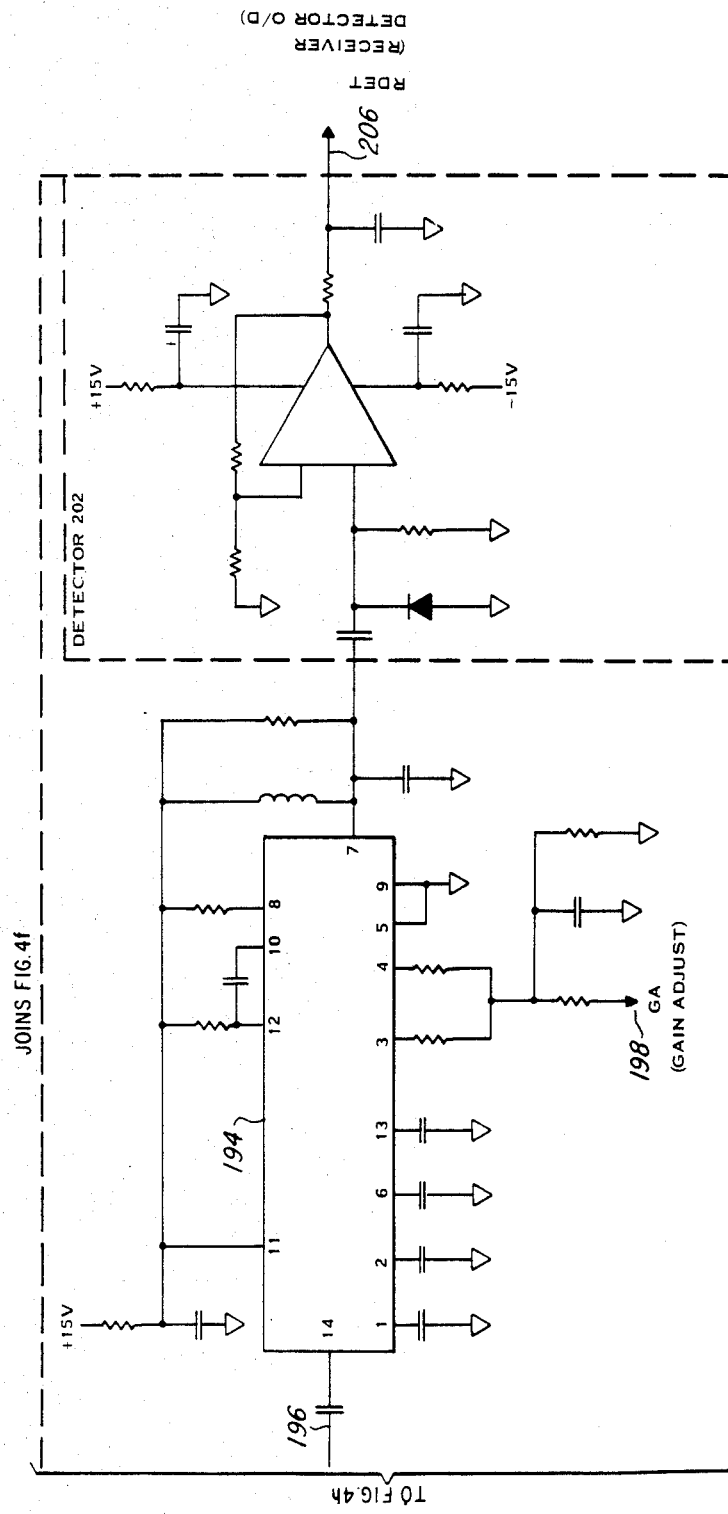

A high gain automatic gain control (AGC) means 194 (FIG. 4i) is connected by lead 196 to amplifier 192 (FIG. 4h). AGC 194 (FIG. 4i) has pins 3 and 4 connected by lead 198 (FIGS. 4i, 5j, 5i and 5h) to DAC amplifier 200 (FIG. 5h) of the gain adjust output of the digital processor 40 (FIG. 5a). The amount of gain fed into AGC 194 (FIG. 4i) determines the amplitude of the filtered input to the AGC. A detector 202 is connected to the AGC 194. A buffer 204 (FIG. 5d) is connected by lead 206 (FIGS. 5d, 5e and 4i) to the detector 202 (FIG. 4i). A diode 208 (FIG. 5d) has its cathode connected through resistor 210 to the buffer 204 and its anode is connected by lead 212 to a valley detector 14 (FIGS. 5c and 5d).

VALLEY DETECTOR

The valley detector 214 includes a transistor 216 (FIG. 5d), a capacitor 218 (FIG. 5c) and a comparator 220. The diode 208 (FIG. 5d) is connected by lead 212 to the junction of the collector of transistor 216, positive plate of capacitor 218 (FIG. 5c) and negative terminal of comparator 220. The emitter of transistor 164 is connected to a +5 V source and the base is connected through a bias resistor by lead 222 (FIGS. 5d and 5e) to the Q5 terminal of output latch 170 (FIG. 5e) of the digital processor means 40. The CRUIN pin of digital processor 226 (FIG. 5a) is connected by lead 224 (FIGS. 5a, 5b and 5c) to the output of comparator 220 (FIG. 5c).

When the voltage output of buffer 204 (FIG. 5d) is greater than a preselected value the comparator 220 output (FIG. 5c) is a logic low and when the voltage is less than the preselected value the comparator output is a logic high. The output at the Q5 pin of output latch 170 (FIG. 5e) when low turns on transistor 216 (FIG. 5d) to charge the capacitor 218 to a preselected voltage (+5 V). Then the transistor 216 is cut off by the output latches Q5 pin output going high and the capacitor 218 (FIG. 5c), discharges to the voltage output of buffer 204 (FIG. 5d). The transistor 216 is then again turned on by the output latch 170 (FIG. 5e) to charge the capacitor 218 (FIG. 5c) and after a preselected time (1 millisecond) cut off. The capacitor 218 discharges at cut off to the lowest voltage output of buffer 204 (FIG. 5d). Thus the valley detector process permits sampling between receipt of any LORAN C pulses from the signals to the comparator 220 (FIG. 5c). The comparator 220 detects interferers to a preselected amplitude value (2.5 V) at which time it switches polarity thereby signaling by means of logic highs and lows the digital processor 226 the presence and amplitude of an interferer at the frequency selected by the digital processor controller means 40.

DIGITAL PROCESSOR CONTROLLER

Referring now to FIGS. 5a–5j for a description of the digital processing controller 40. A digital processor 226 (FIG. 5a), which may be for example a Texas Instruments Incorporated (TMS 9981), is a single chip 16-bit control processing unit (PU) having an 8-bit data bus, on-chip clock, and is packaged in a 40-pin package. The TMS 9981 has a communications register unit input (CRUIN) pin 19, a CRU clock (CRUCLK) pin 37, and a CRU OUT pin 4 (A-13) and 11 bits (A2–A12) pins 5–15 of the address bus to interface with the CRU system. The address bus (A$_0$ thru A$_{13}$) is a 3-state bus which provides the memory address vector to the external-memory system when memory enable (MEMEN) pin 40 is active and I/O bit addresses and external-instruction addresses to the I/O system when MEMEN is inactive.

Serial I/O data appears on A-13 (CRU OUT) pin 4 when an LDCR, SB2 and SB0 instruction is executed. One bit of the external instruction code appears on A-13 during external instruction execution.

The data bus (D0 thru D7, pins 25–32) is a bidirectional 3-state data bus. This bus transfers memory data to (when writing) and from (when reading) the external-memory system when MEMEN is active. The data bus assumes the high impedance state when HOLDA is active.

The power supplies include a 5 V NOM Vcc on pin 20, a 22 V NOM VDD on pin 36 and ground reference on VSS pin 35.

The clocks include a clock in (CKIN) pin 34 and an oscillator out (OSOUT) pin 33. These pins may be used in either of two modes to generate the internal 4-phase clock. In mode 1 a crystal of 4 times the desired system frequency is connected between CKIN and OSOUT. In mode 2 OSOUT is left floating and CKIN is driven by a TTL compatible source whose frequency is 4 times the desired system frequency. Clock phase 3 ($\phi$3) pin 21 inverted is used as a timing reference.

Bus control is provided by the DBIN pin 18. When active (high), DBIN indicates that the TMS 9981 has disabled its output buffers to allow the memory to place memory-read data on the data bus during $\overline{\text{MEMEN}}$. DBIN remains low in all other cases except when HOLDA is active at which time it is in the high-impedance state.

When the $\overline{\text{MEMEN}}$ pin 40 is active (low), MEMEN indicates that the address bus contains a memory address.

When the write enable ($\overline{\text{WE}}$) pin 38 is active (low), $\overline{\text{WE}}$ indicates that memory-write data is available from the TMS 9981 to be written into memory.

The CRU clock (pin 37) when active (high) indicates that external interface logic should sample the output data on CRUOUT or should decode external instructions on A0, A1, A13 (pins 17, 16, 4).

The interrupt (INT) pins 22, 23 and 24 are connected together at pin 24 (INT0).

The memory is controlled by $\overline{\text{HOLD}}$ (pin 1) which when active (low) indicates to the processor that an external controller desires to utilize the address and data buses to transfer data to or from memory. The processor then places the address on data buses in the high impedance state (along with $\overline{WE}$, $\overline{MEMEN}$, and $\overline{DBIN}$) and responds with a hold-acknowledge signal (HOLDA, pin 2). When hold is removed the processor returns to normal operation.

When READY (pin 39) is active (high) it indicates that memory will be ready to read or write during the next clock cycle.

As previously indicated the CRUIN pin 19 of the digital processor 226 (FIG. 5a) is connected by lead 224 through the valley detector circuit 162 to the tuneable receiver and amplitude measuring circuit 38 (FIG. 1) for receiving detector information indicating whether an interferer exists at any of the frequencies scanned. The remaining pins of the digital processor 226 are connected as follows.

The CRU clock pin 37 is connected by lead 234 (FIGS. 5a-5e) to an input terminal of NAND gate 236 (FIG. 5e).

The CRU OUT (A13) pin 4 is connected to the junction of lead 238 to the D pin 12 of the flip flop 240 and input pin 4 of exclusive OR gate 242 of a decoder logic circuit 244 (FIG. 5a) and lead 246 (FIGS. 5a-5e) to the A0 pins of ROM 248 (FIG. 5b) and RAMS 250 and 252 (FIG. 5c) and junction of leads 254 (FIG. 5e) to pin 12 of exclusive OR gate 256 and pin 5 of NAND gate 258 of latch load and outboard DAC W/R logic circuits 260 and lead 262 to the D pin 3 of output latch 170.

The A12-A7 pins (FIG. 5a) are connected by leads 264-274, respectively, to the A1-A6 pins of ROM 248 (FIG. 5b) and RAMs 250 and 252 (FIG. 5c) and to the A0, A1, A2, pins of output latch 170 (FIG. 5e) and D pin 6 of latch 278 (FIG. 5f) and D pins 11, 13, 14 of latch 278 of the programmable attenuator latches 280.

Figure 5B:
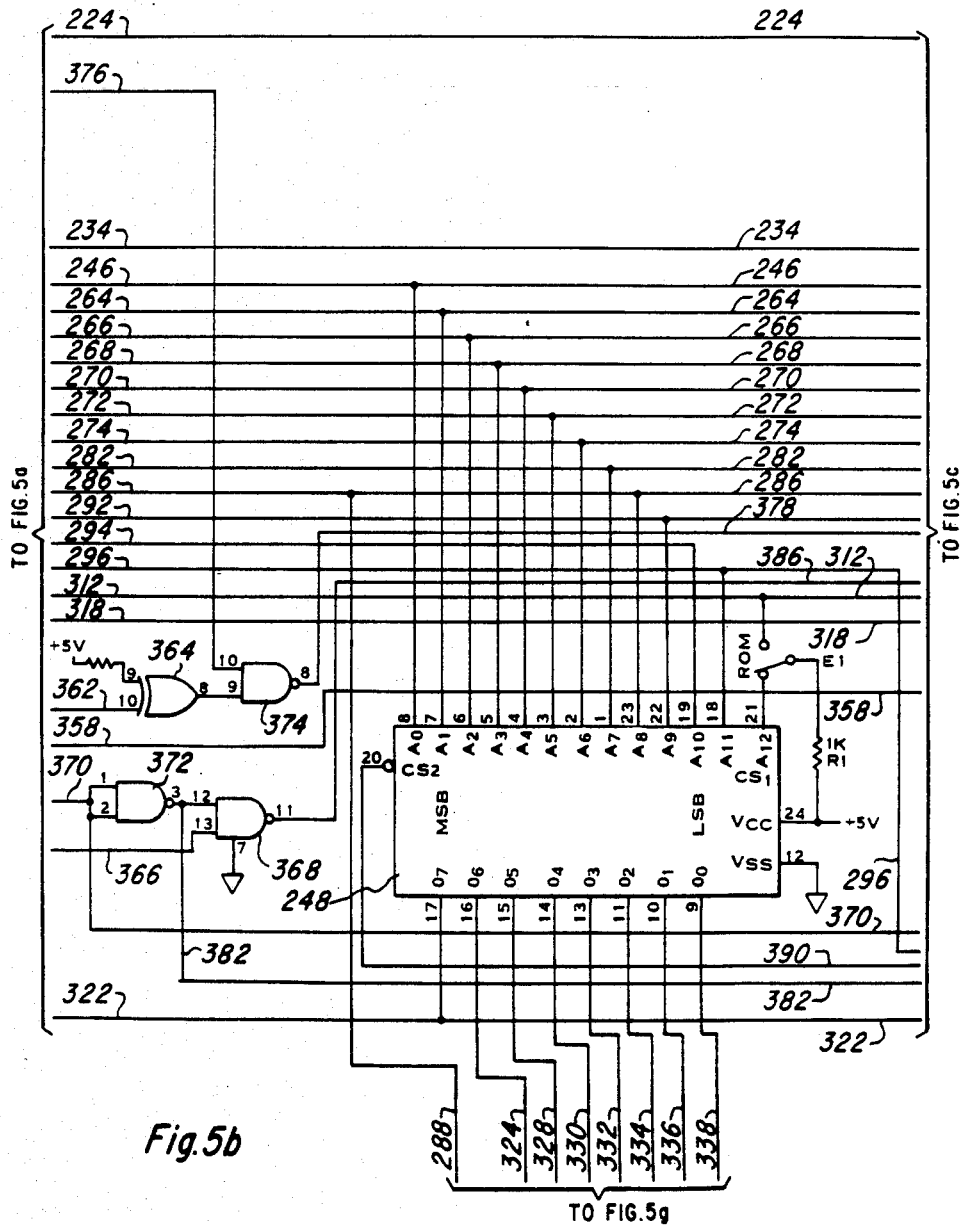
Figure 5C:
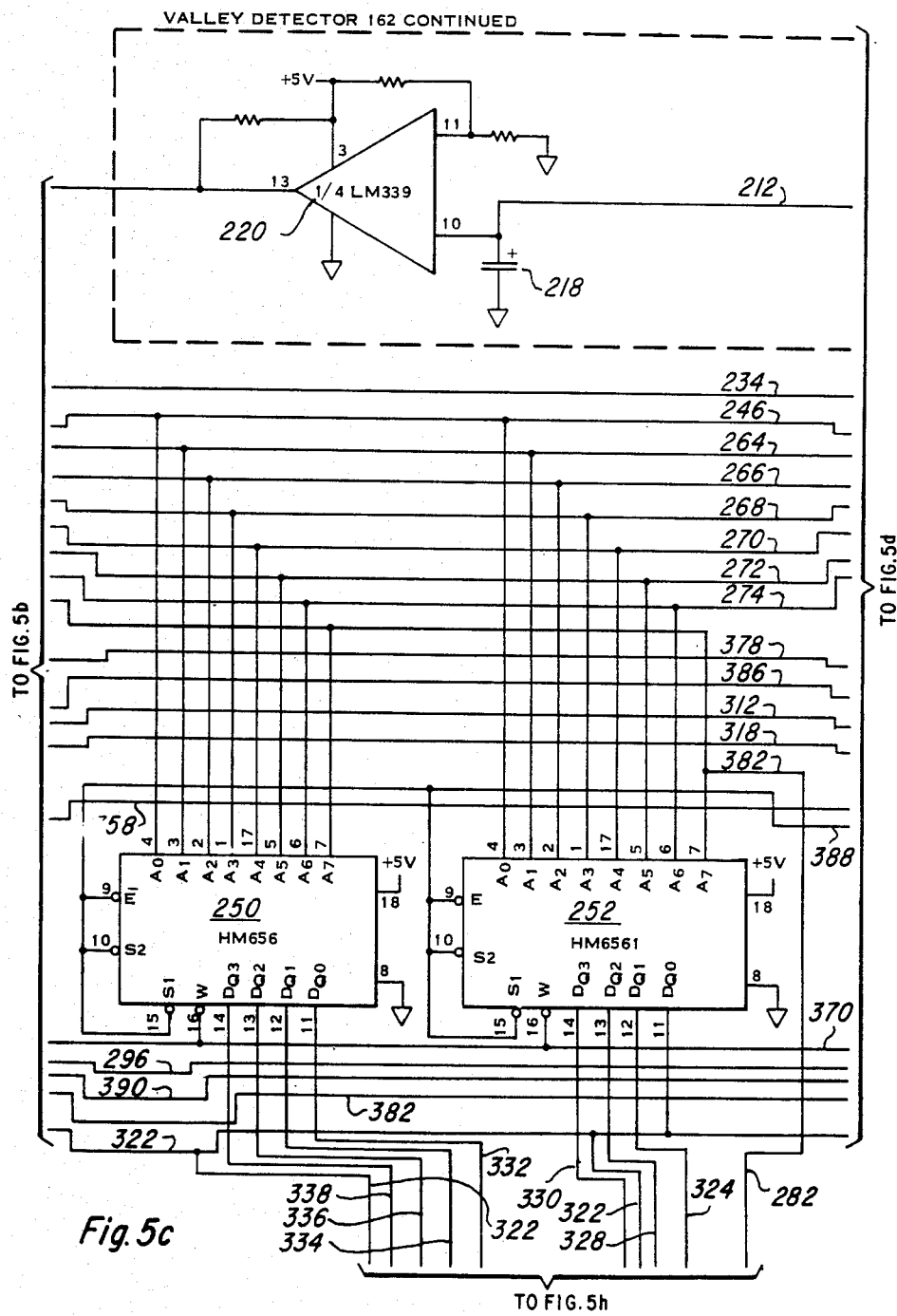
Figure 5D:
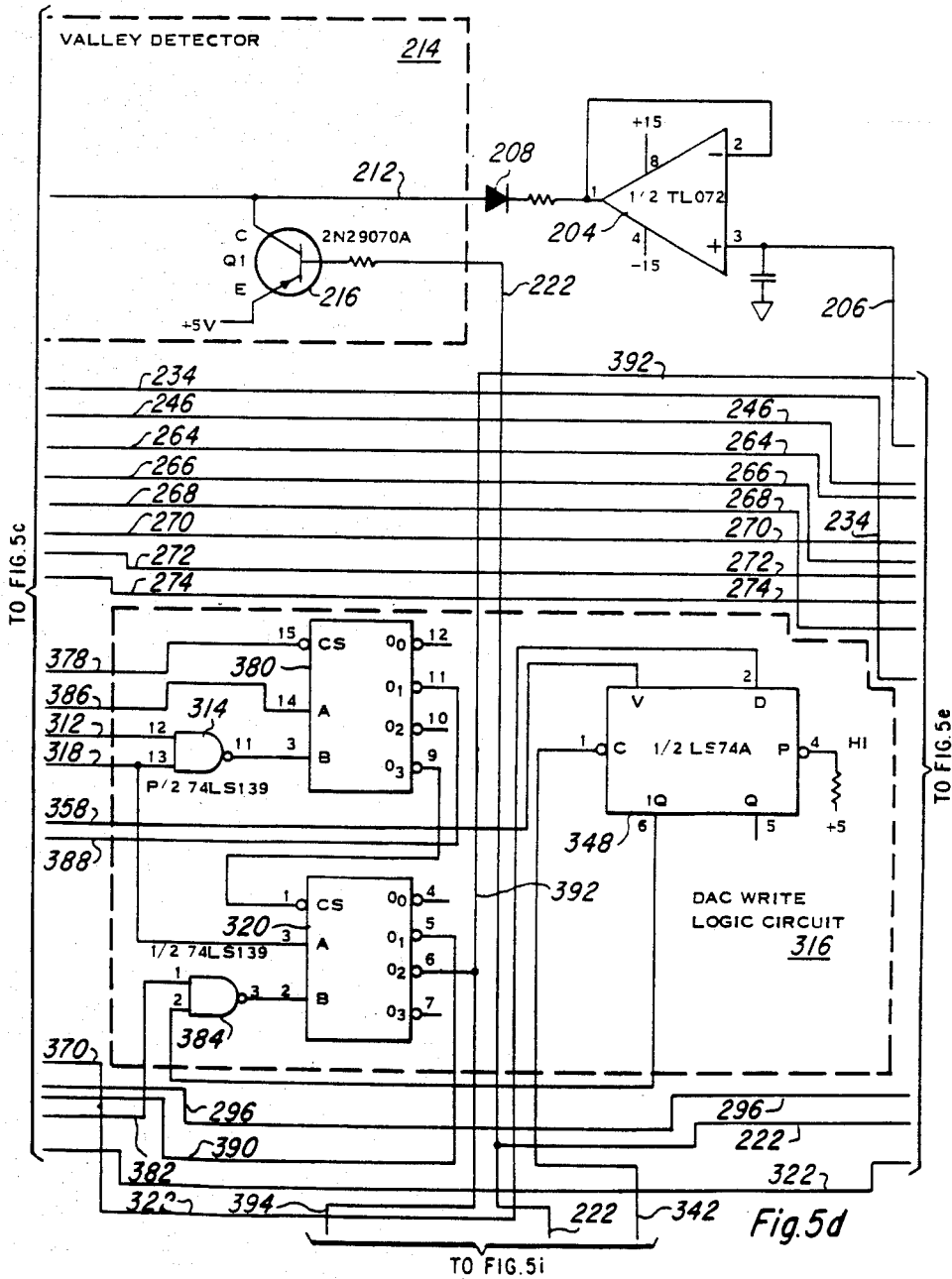
Figure 5E:
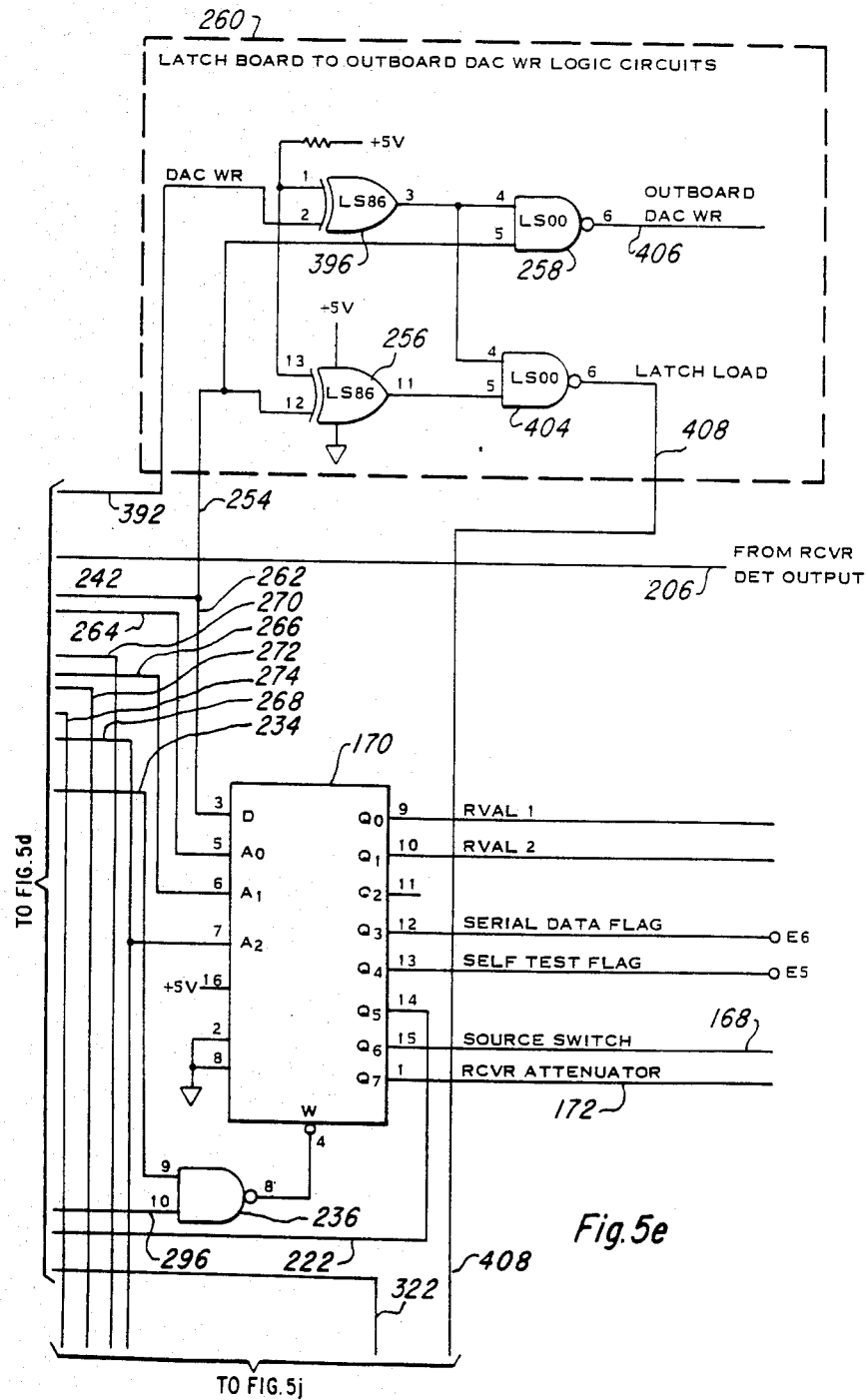
Figure 5F:
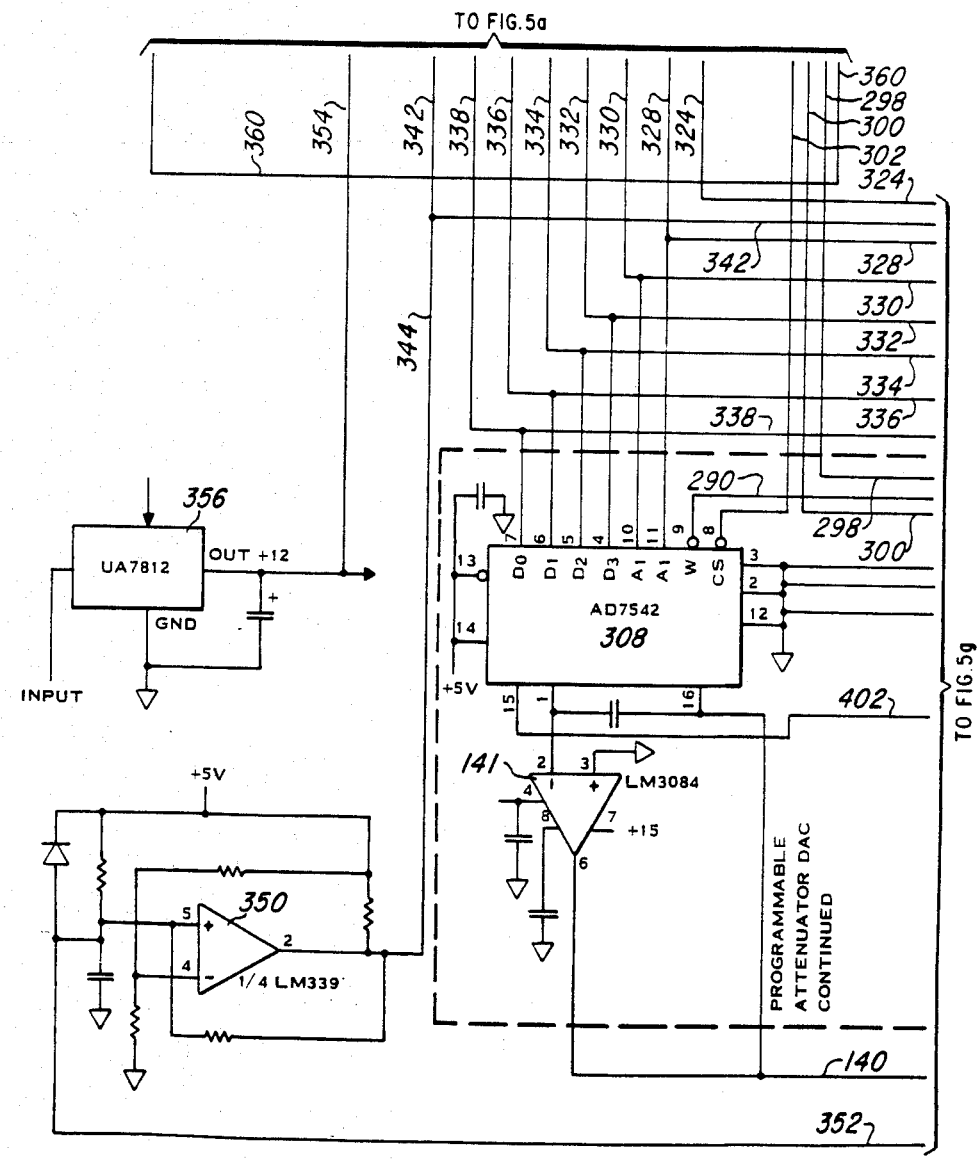
Figure 5G:
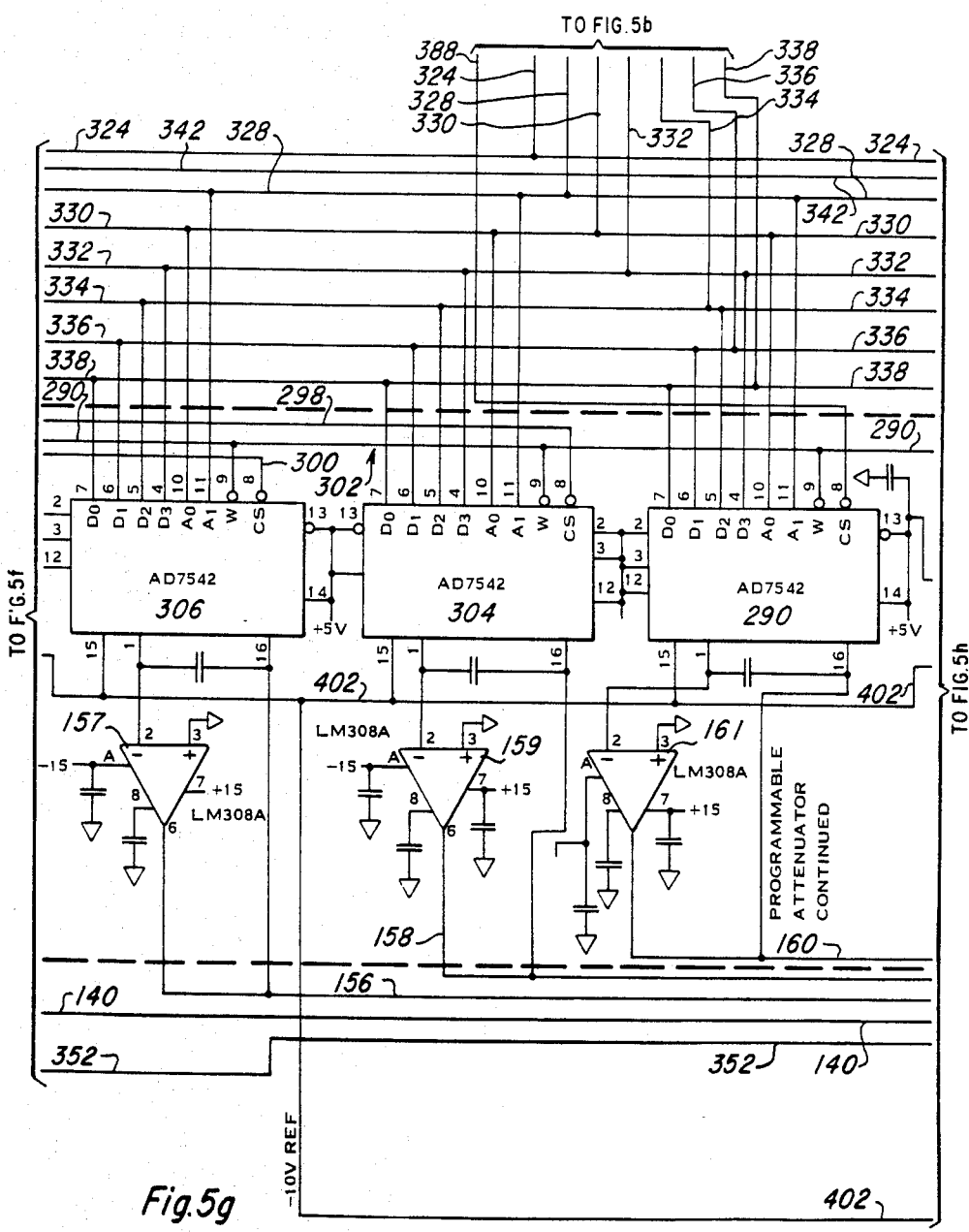
Figure 5H:
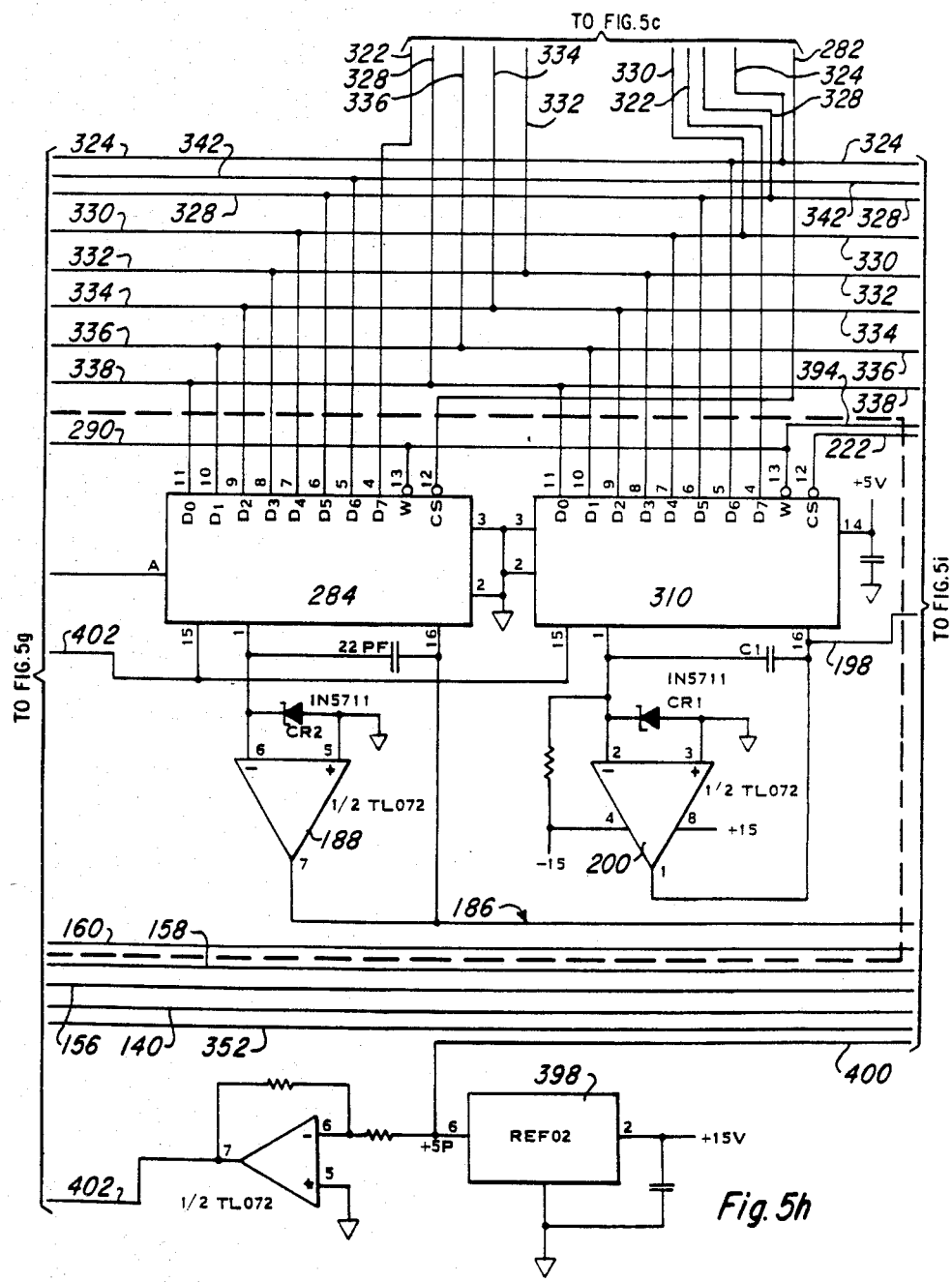
Figure 5I:
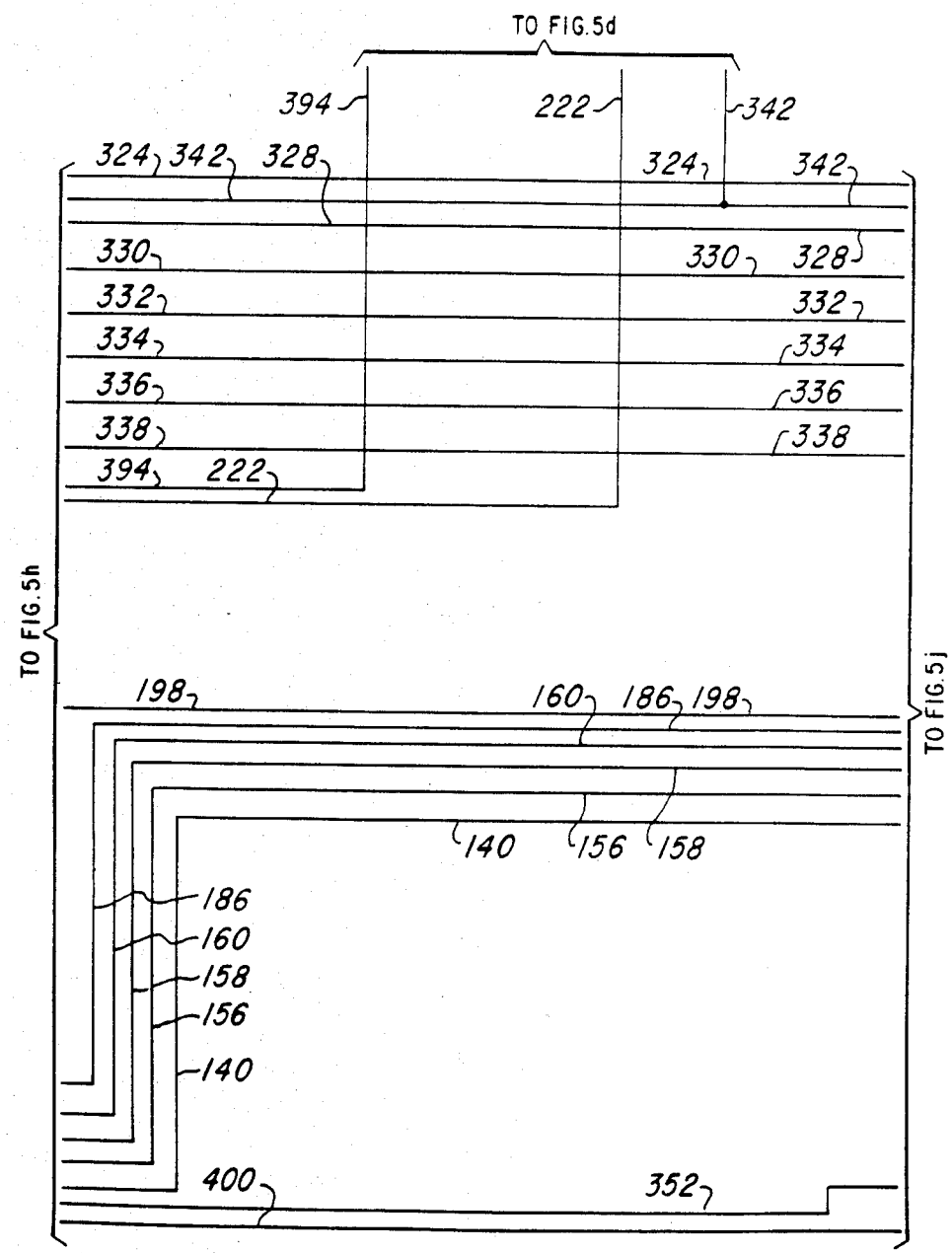

The A6 pin (FIG. 5a) by lead 282 of the A7 pins of ROM 248 (FIG. 5b), RAM 250 and RAM 252 and to the enable CS pin 12 of DAC 284 (FIG. 5h).

The A5 pin (FIG. 5a) is connected by lead 286 to the junction of lead 288 to the enable (CS) pin 8 of DAC 290 (FIG. 5g) and the A8 pin ROM 248 (FIG. 5b).

The A4, A3 and A2 pins 13-15 (FIG. 5a) are connected by leads 292, 294 and 296, respectfully, to the junctions of the A9-A11 pins of ROM 248 and of leads 298, 300 and 302 to the enable ($\overline{CS}$) pins 8 of DAC's 304, 306 (FIG. 5g) and 308 (FIG. 5f). The A2 pin is also connected by lead 296 to pin 10 of NAND gate 236 (FIG. 5e). NAND gate 236 is connected to the write pin 4 of output latch 170. The enable (CS) pin 12 of DAC 310 (FIG. 5h) is connected by lead 222 to the Q5 pin 14 of output latch 170 (FIG. 5e).

The A1 pin 16 (FIG. 5a) is connected by lead 312 to the A12 pin of ROM 248 (FIG. 5b) and pin 12 of NAND gate 314 (FIG. 5d) of the DAC write logic circuit 316.

The A0 pin 17 (FIG. 5a) is connected by lead 318 to pin 13 of NAND gate 314 (FIG. 5d) and the select B pin 3 of decoder 320, both of the DAC write logic circuit 316.

The pins 20, 1 and 39 (FIG. 5a) are connected to a plus 5 V power source, and pins 33, 34 and 35 are connected to the oscillator out timing for the processor 226.

Figure 5J:
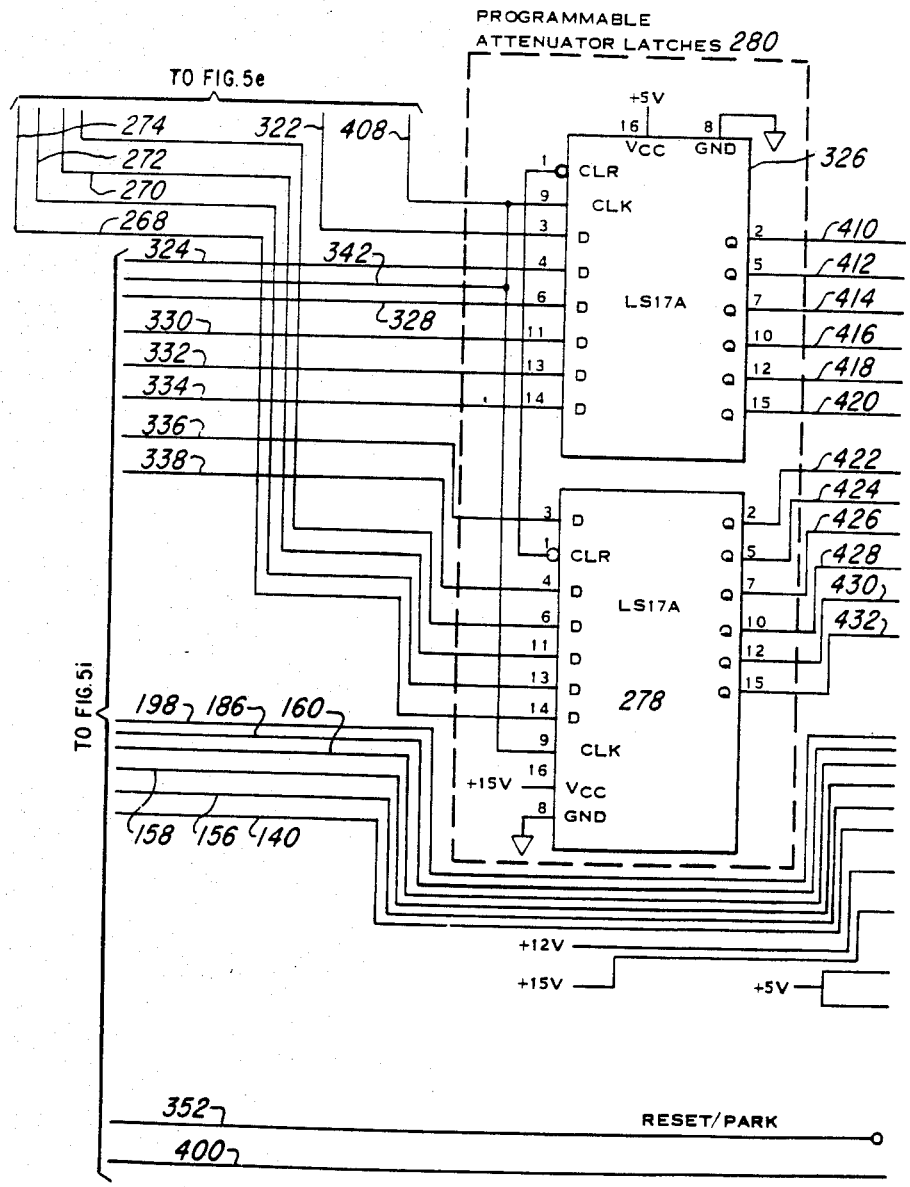

The data pins D0-D7 (FIG. 5a) are connected as follows. The D0 pin 25 and D1 pin 26 are connected by leads 322 and 324, respectively, to the MSB D7 pin 17 and pin 16 of ROM 248 (FIG. 5b), to D7 pins 4 and D6 pins 5 of DAC's 284 and 310 (FIG. 5h), DQ0 pin 11 and DQ1 pin 12 of RAM 252 (FIG. 5c) and to D pin 3 and D pin 4 of latch 326 of programmable attenuator latches 280 (FIG. 5j).

The D2-D7 pins 27-32 (FIG. 5a) are connected by leads 328-338, respectively, to the A1, A0 and D3-D0 pins of DAC's 308 (FIG. 5f), 306, 304 and 290 (FIG. 5g), to the D6-D0 pins 9-16 of ROM 248 (FIG. 5b), to the D5-D0 pins 11-6 of DAC's 284 and 310, to the DQ2 and DQ3 pins 13 and 14 of RAM 252 (FIG. 5c) and DQ0-DQ3 pins 11-14 of RAM 250, and to the D pins 6, 11-14 of latch 326 (FIG. 5j) and D pins 3 and 4 of latch 278 of the programmable attenuator latches 280.

The interrupt pin 24 (FIG. 5a) is connected to the junction of leads 340, 342 and 344. Lead 340 connects the interrupt pin to the clear pin of flip flop 240 of decoder circuit 244. Lead 342 connects the interrupt pin to the clear pins 1 of flip flop 348 (FIG. 5d) and latches 326 and 278 (FIG. 5j) of the programmable attenuator latches 280, while lead 344 (FIG. 5f) connects reset/park. Operational amplifier 350 (FIG. 5f) is connected by lead 352 to reset/park diode to +5 V source.

The VCC pin 36 is connected by lead 354 to a voltage regulator 356.

The $\overline{\phi 3}$ (clock) pin 21 is connected to the junction of leads 358 and 360. Lead 358 connects the $\overline{\phi 3}$ pin to the clock pin 3 of flip flop 348 (FIG. 5d) of the DAC write logic circuit 316. While lead 360 (FIG. 5a) is connected to the clock pin 11 of flip flop 240 of decoder circuit 244.

The memory enable ($\overline{MEMEN}$) pin 40 (FIG. 5a) is connected by lead 362 to exclusive OR gate 364 (FIG. 5b), and the write enable ($\overline{WE}$) pin 38 (FIG. 5a) is connected by lead 366 to NAND gate 368 (FIG. 5b).

The data bus in ($\overline{DBIN}$) pin 18 (FIG. 5a) is connected by lead 370 to the 1,2 pins of NAND gate 372 (FIG. 5b), the write (W) pins 16 of RAM's 250 and 252 (FIG. 5c), and data (D) pin 2 of flip flop 348 (FIG. 5d) of DAC write enable logic circuit 316.

The memory enable exclusive OR gate 364 (FIG. 5b) has its pin 9 connected to a plus 5 V pull up resistor and its output pin 8 connected to NAND gate 374. NAND gate 374 is connected by lead 376 to the output of exclusive OR gate 242 (FIG. 5a) of decoder circuit 244. The decoder circuit flip flop 240 has its $\overline{Q}$ output connected to exclusive OR gate 242. Thus, the exclusive OR gate 242 is active whenever the clock or CRU OUT is active. NAND gate 374 is connected by lead 378 to the enable ($\overline{CS}$) pin of decoder 380 (FIG. 5d) of DAC write enable logic circuit 316.

The bus control ($\overline{DBIN}$) NAND gate 372 (FIG. 5b) has its output connected to the write enable NAND gate 368 and lead 382. Lead 382 is connected to NAND gate 384 (FIG. 5d) of the DAC write logic circuit 316. NAND gate 368 (FIG. 5b) is connected by lead 386 to the A select pin 14 of decoder 380 (FIG. 5d). The B select pin 13 of decoder 380 is connected to NAND gate 314.

Decoder 380 has its D1 output pin 11 connected by lead 388 to the enable pins 9, 10, and 15 of RAM's 250 and 252 (FIG. 5c), and its D3 output pin 9 (FIG. 5d) connected to the enable ($\overline{CS}$) pin 1 of decoder 320.

Decoder 320 has its D1 output pin connected by lead 390 to the enable ($\overline{CS2}$) pin 20 of ROM 248 (FIG. 5b), and its D2 output pin 6 connected to the junction of leads 392 and 394. Lead 392 is connected to exclusive OR gate 396 (FIG. 5e) of the latch load and outboard DAC $\overline{WR}$ logic circuit 260; while lead 394 (FIG. 5d) is connected to the write ($\overline{W}$) pins 13 of DAC's 310, 284 (FIG. 5h), 290, 304, 306 (FIG. 5g) and 308 (FIG. 5f). A voltage regulator 398 (FIG. 5h) is connected by lead 400 to a +5P (precision) source and by lead 402 to the pins 15 of DAC's 310, 284 (FIG. 5h), 290, 304, 306 (FIG. 5g) and 308 (FIG. 5a).

Exclusive OR gates 396 and 256 (FIG. 5e) of the latch load and outboard DAC $\overline{\text{WR}}$ logic circuits 260 have input pins 1 and 13 connected to a +5 V pull up resistor. Exclusive OR gate 396 is connected to NAND gates 258 and 404. The $\overline{\text{WR}}$ output of NAND gate 258 is connected by lead 406 to the read/write pins 13 of DAC's 116 of the programmable attenuators of notch filters 108, 110, 112, and 114 (FIGS. 4a–4f). The exclusive OR gate 256 is connected to NAND gate 404 of the latch load circuit. The output of latch load NAND gate 404 is connected by lead 408 to the clock (CLK) pins 9 of latches 326 and 278 (FIG. 5j) of the programmable attenuator latches 280.

Latch 326 (FIG. 5j) of programmable attenuator latch 280 has its Q pins 2, 5, 7, 10, 12 and 15 connected by leads 410, 412, 414, 416, 418 and 420 to the D7–D2 pins, respectively, of DAC's 116 of the programmable attenuators 109 of notch filters 108, 110, 112 and 114 (FIGS. 4a–4e); while programmable attenuator's latch 278 (FIG. 5j) has Q pins 2 and 5 connected by leads 422 and 424, respectively, to the D1 and D0 pins of the DAC's 116 and Q pins 7, 10, 12 and 15 connected by leads 426, 428, 430 and 432, respectively, to the enable CS1, CS2, CS3 and CS4 pins 12 of the DAC's 176 of the programmable attenuators 109 of notch filters 108, 110, 112 and 114 (FIGS. 4a–4e).

SOFTWARE FLOW CHARTS

Referring now to FIGS. 6a–6h for a description of the software, the software executes continuously while power is applied to the auto notch system. Upon power up the software does an initialize 500 (FIG. 6a) which clears the controller registers, loads the notch filter's frequency DACs with the "parking" frequency of 50 KHz for the two "low" filters and 150 KHz for the two "high" filters and the amplitude control DACs with a mid range starting value for gain. After initialization, the software enters a continuous loop, including a bandscan module 504 and a notch module 506, until power down.

During bandscan the frequency band (50 KHz to 150 KHz) is scanned to identify and to store the four worst interferers; while during notch the interferers are assigned to notch filters. They are attenuated by coarse and fine tuning the frequency RN1 (NOTCH) etc. response of the notch filters to the frequency RN1 (DIRECT) etc. of the interferers.

Bandscanning is accomplished by scanning frequency band outside the guard band for interferers. This involves finding the peak and valley frequencies of the interferers. The guard band is the frequency band containing the desired signals which, for example, is 90 KHz to 110 KHz for Loran signals.

The notch assignment function will assign the two notch filters in tandem to one interferer if that interferer is so strong that one notch cannot filter it to below the level of another interferer; that is, an extraordinarily strong interferer will be "double notched (DBLN) while a weaker interferer goes without a notch.

The software continuously scans the band and tags the two worst interferers in the low band and the two worst interferers in the high band. Any change in the interferers such as the appearance of a new strong interferer or a change in the relative strength of the present interferers will cause the notch assignment part of the software to reassign the notches so as to minimize the effect of the new interferers. In addition, when conditions remain stable for at least ten consecutive scan cycles, the software will perform a more critical, or higher resolution, scan in the vicinity of the present interferers. This will expose the presence of adjacent interferers that may have been detected as a single interferer by the more coarse scan. If adjacent interferers are discovered, the software will then evaluate their relative strength; and if filters (notches) can be assigned to each individual interferer to further minimize their effect such assignment will take place.

During bandscan four registers are used, two working registers and two TAG registers. The subroutine loads the TAG registers with the identity (the frequency location and relative amplitude) of each of the two worst interferers if found, or with zeros if it did not find an interferer to tag. The two working registers are zeroed at the start of the search scan and are used during the search to store the current two worst interferers found. One reason for having four registers is to compare the results of the current scan with the tag, which contains the results of the previous scan. This comparison is done by a subroutine of the next module to execute, which is basically an implementation of a decision sequence.

The search routines load the bandpass receiver's tuning DAC with a frequency address to tune the receiver to that particular frequency. Lowscan at zero corresponds to 50 KHz, N=0, and goes up to about N=131 which corresponds to 90 KHz. Highscan then begins at 110 KHz and goes up to N=255 which corresponds to 150 KHz (band scan). While the subroutine looks at the band, it is searching for a peak in the measured signal. When the peak is sensed it is verified and its frequency and amplitude are then compared to the two highest interferers previously detected. If the new peak is larger it replaces the smaller of the two stored interferers.

Upon completion of bandscan, NOTCH module begins execution. Notch takes the information given by bandscan, the frequency and amplitude of the two worst lowband and the two worst highband interferers, and proceeds to assign notch filters to them, and to tune the notch filters so as to minimize the amplitude of the interferer signals at the input to the Loran receiver. Notch does this assignment of the filters based upon a set of criteria against which the interferers are checked by a subroutine called sort and assign subject to the outcome of SORT AND ASSIGN. The filters are coarse tuned, fine tuned and/or double assigned to one interferer, then fine tuned.

At the completion of NOTCH the software has finished a cycle and a new cycle begins with execution of bandscan. This process repeats while power is up. The only exception is an extended cycle which does a second scan with the notch filter inserted in the line, if ten consecutive cycles with only one interferer have taken place.

As the two strongest interferers in the low band and in the high band are to be located and attenuated and the software is identical, except for values for each, only the software for locating RN1 (DIRECT) and RN2 (DIRECT) and attenuating them with RN1 (NOTCH) and RN2 (NOTCH) will be described.

After the initialization the bandscan module performs (FIG. 6b) a Peak Search/Verify subroutine which includes START 508. After START an instruction 510 is issued to start frequency incrementation, and a decision 512 is made as to whether the frequency is in the guard band. If the decision is YES, EXIT 514 is made; if the decision is NO, an instruction 516 is issued to measure the amplitude. Then a decision 518 is made whether the amplitude is greater than the measurement by plus five counts. If YES, an instruction 520 is issued to store the amplitude as a peak and the software returned to the INCREMENT FREQ. step 510; if NO, a decision 522 is made whether the amplitude is less than the preceeding frequency by eight counts. If NO, the software is returned to the INCREMENT FREQ. step 510, if YES, an instruction 524 is issued to verify the amplitude with three measurements. A decision 526 is made whether a peak is equal to the highest measurement ±1 three counts and if no instruction 528 sets the amplitude equal to zero as the identification of a peak was not verified. This verification provides discrimination against incorrect measurements and decisions due to noise code type on-off keyed signals.

Then a decision 530 is made whether the peak is greater than the preceeding two peaks A1 and A2 found in this band segment. If NO, EXIT 514 is made; if YES, an instruction 532 is issued to store the peak as a replacement for the lower of A1 and A2 before EXIT 514. EXIT 514 is a routine which determines whether to continue scanning, to switch to valley (peak) search or to go to NOTCH.

After a peak detection, a valley search/verify routine (FIG. 6c) begins at START 500. After start an instruction 510 is issued to increment the frequency (incrementation is a continuation of the frequency in bandscan) and a decision 512 is made whether the frequency is within the guard band. If YES, EXIT 514 is made; if NO, an instruction 516 is issued to measure the amplitude. After measurement a decision 534 is made whether the amplitude measurement is less than the preceeding amplitude measurement by 5 counts. If YES, an instruction 536 is issued to store the amplitude as a valley and the software returned to the INCREMENT FREQ. step 510; if NO, a decision 538 is made whether the measured amplitude is greater than the preceeding measurement by eight counts. If NO, the software is returned to the INCREMENT FREQ. step 510; if YES, an instruction 540 is issued to verify the decision with three measurements and a decision 542 made whether the valley is equal to the lowest measurement plus or minus three. If NO, an instruction 544 is issued to set the amplitude at 500 counts and the frequency equal to the frequency plus eight counts and the software returned to the INCREMENT FREQ. step 510; if YES, EXIT 514 is made to either re-enter the peak search routine or to being the NOTCH routine.

At this point F1A1 is the frequency and amplitude of the strongest interferer found in the low (high) band and F2A2 is the frequency and amplitude of the second strongest interferer.

RN1 is the frequency to which notch filter 1 was tuned on a previous pass and RN2 is the notch filter 2 previously tuned frequency.

After bandscan the software enters the NOTCH module frequency sort subroutine. In this routine "equals" means "within five counts of". After ENTER 534 (FIG. 6d) an instruction 536 is issued to reset FLAGS 1 and 2 (Fine Tune Flags) and a decision 538 made whether F1A1 (frequency and amplitude of the first interferer) is equal to RN1 (the frequency and amplitude of the NOTCH filter's corresponding signal). If the decision 538 is YES, an instruction 540 is issued to let RN1 equal F1A1 (put the new F1 frequency into the register which holds RN1) and to set FLAG 1. This operation means that the strongest interferer found was the same frequency to which RN1, notch 1, is already tuned, set Flag 1 tells the program later that only fine tuning is necessary. Then the software proceeds to the connector 542 (F2A2 TEST) (F2A2 is frequency and amplitude of second interferer). If the decision 538 is NO, a decision is made whether F1A1 is equal to RN2 (second interferer frequency and amplitude for NOTCH corresponding to A2F2). If NO, the software proceeds to the connector 542; if YES, then an instruction 546 is issued to let RN2 equal F1A1 and set FLAG 2 prior to proceeding to connection 542 for F2A2 test. (This result will occur if Notch 2 was previously set to reject the same frequency as F1).

In the F2A2 test, a decision 548 is made whether F2A2 is equal to RN2. If the decision is YES, an instruction 550 is issued to let RN2 equal F2A2 and to set FLAG 2 and EXIT 552 is made; if NO, a decision 554 is made whether F2A2 is equal to RN1. If decision 554 is NO, EXIT is made; if YES, an instruction 556 is issued to let RN1 equal F2A2 and to set FLAG 1 prior to EXIT 552, FIG. 6E.

Figure 6A:
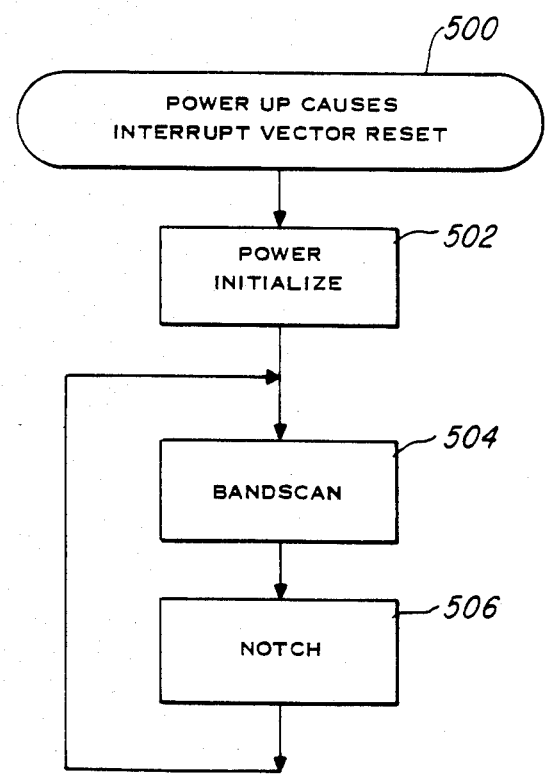
Figure 6B:
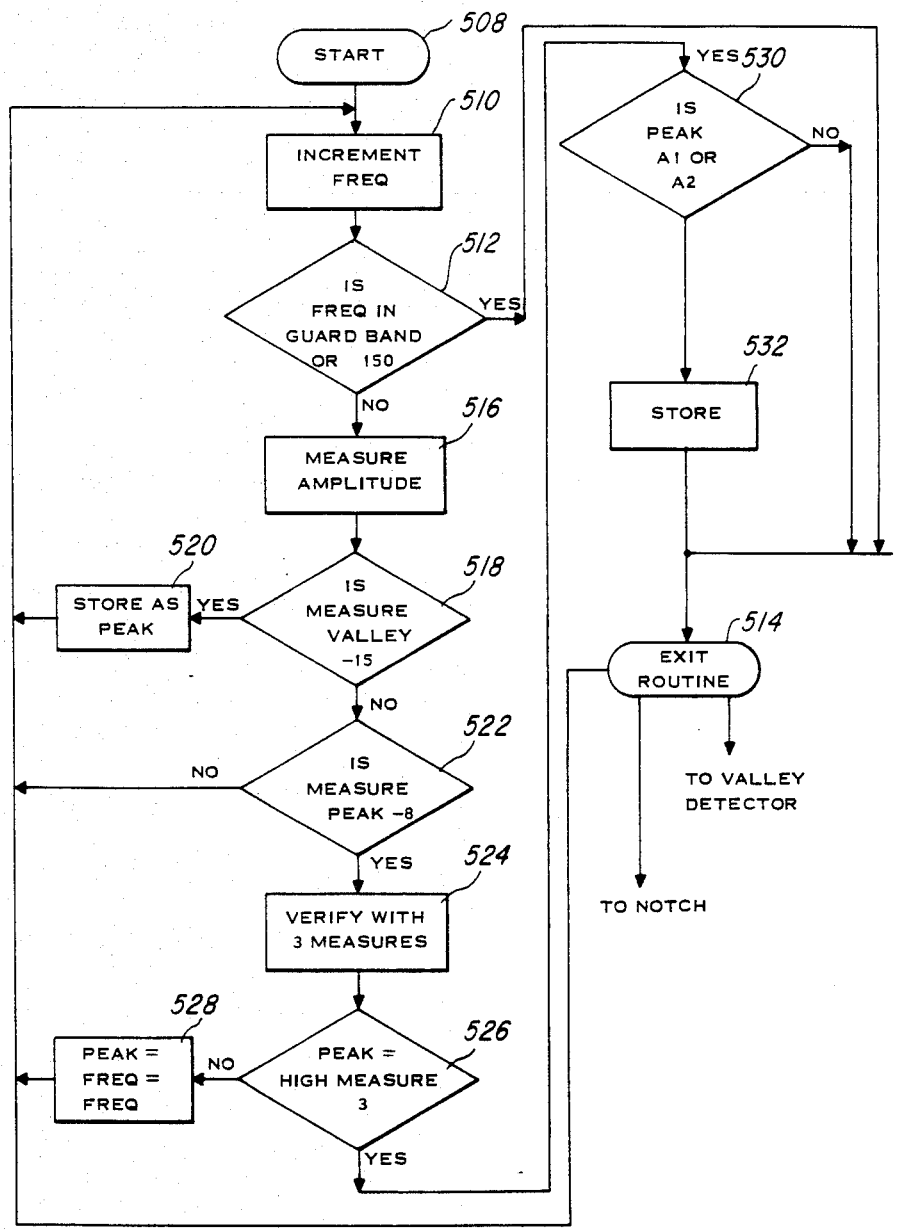
Figure 6C:
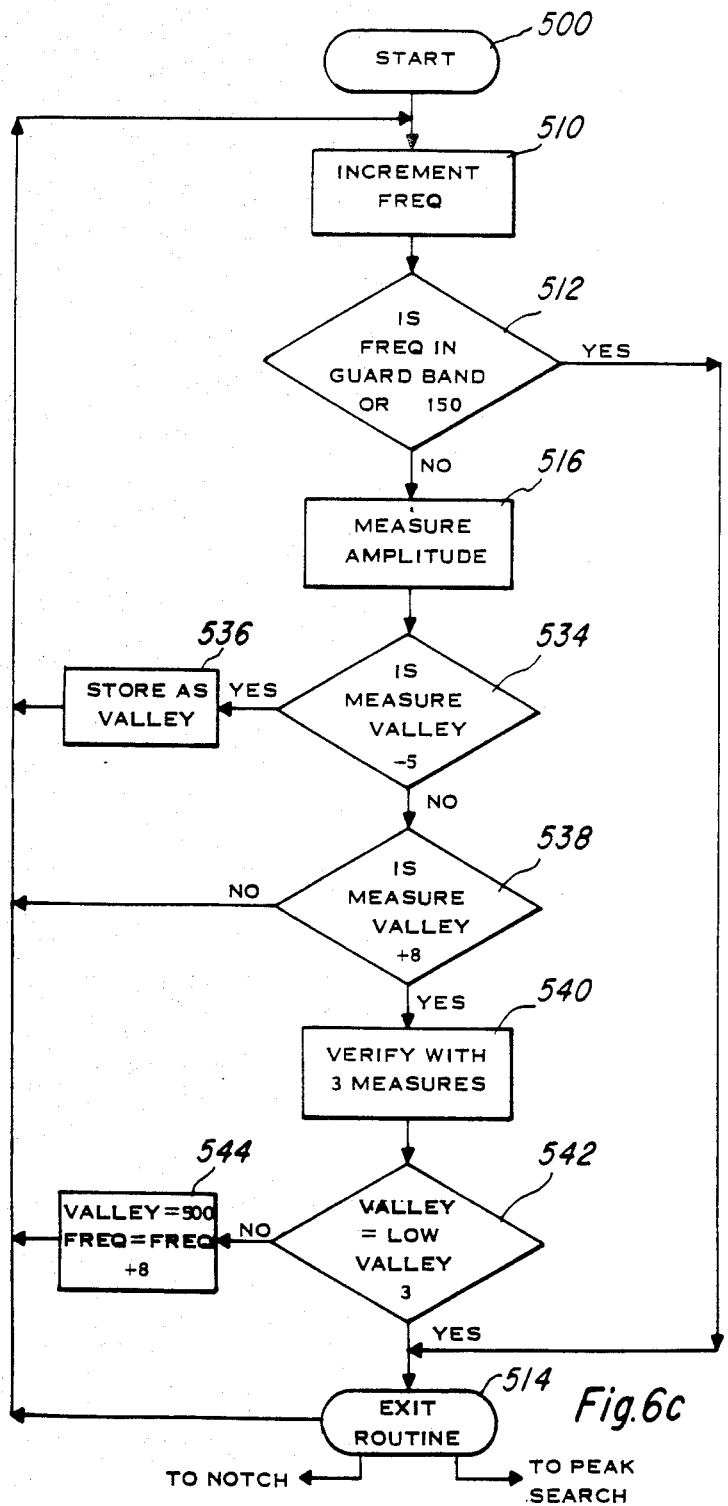
Figure 6D:
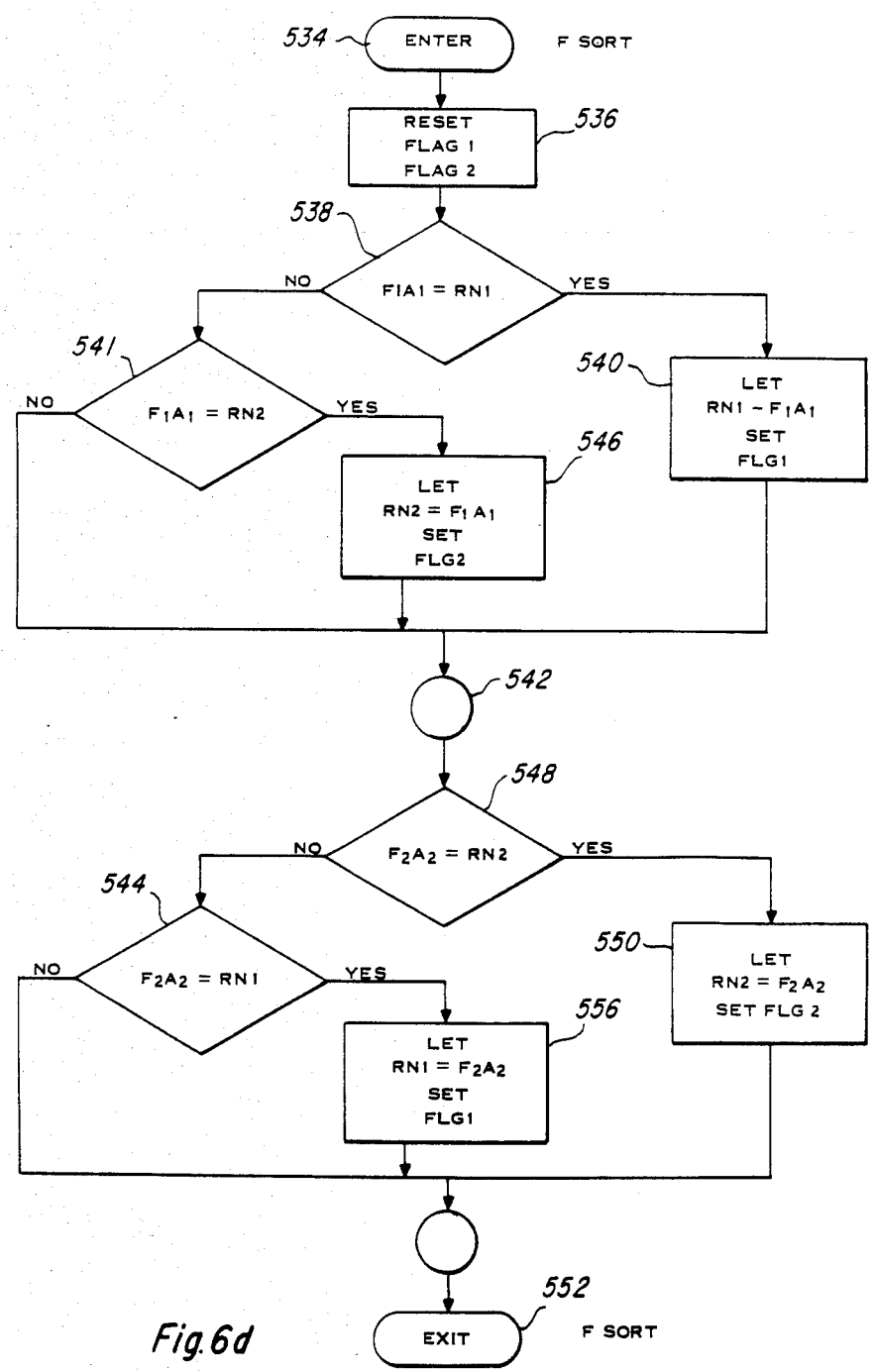

The sort routine (FIGS. 6e & 6f) leaves EXIT 552 FIG. 6d to decision 558. Decision 558 determines whether the first interferer frequency is ready for fine tuning (FINE 1 FLAG SET). If NO, a decision 560 is made whether the second interferer frequency is ready for fine tuning (FINE 2 FLAG SET). If NO, an instruction 562 is issued to put F1A1 frequency into RN1 and an instruction 564 is issued to put F2A2 frequency into RN2. Thus two new interferers have notch frequency assignments.

Returning to decision 558 (FIG. 6e), if YES, a decision 566 (FIG. 6f) is made whether the FINE 2 FLAG is set. If YES, EXIT is made because both interferers are the same frequency as the last notch assignments and both FINE 1 and FINE 2 FLAGS are set; if NO, a decision 568 is made whether F1 is equal to the RN1 frequency. If YES, a condition 570 exists where F1 is the same as RN1 (RN1) and F2 is a new interferer. A decision 572 is made whether the DBLN (double notch) 2 FLAG is set. If YES, a decision 574 is made whether A2 (amplitude of F2A2) (DIR) is eight counts higher than RN2 (NOTCHED) by comparing A2 (DIR) with RN2 (NOTCHED). (A2 (DIRECT) is the amplitude of the second interferer received at the output of the FANO filter). If decision 574 is YES, an instruction of 576 is issued to put F2A2 into RN2; if NO, an instruction 578 is issued to put RN2 (DIRECT) into RN2 and to set FINE 2 FLAG. Returning now to decision 572, if NO, a decision 580 is made whether the amplitude of F2A2 (DIRECT) is greater than the amplitude of RN2 (DIR) by eight counts by comparing A2 (DIR) to RN2 (DIR) (RN2 (DIR) is the preceeding frequency inserted into RN2). If decision 580 is YES, an instruction 576 is issued to put the frequency of F2A2 into RN2. Thus F1 is in RN1, FINE 1 is set and F2 new is in RN2. If decision 580 is NO, then instruction 578 is issued to put RN2 (DIR) into RN2 and FINE 2 FLAG is set. Thus, F1 is RN1, FINE 1 set, and RN 2 is at old RN2, FINE 2 set.

Returning now to decision 568 as to whether F1 is equal to RN1 frequency; if NO, a condition 581 exists where F2 is assigned to NR1 and F1 is a new interferer. A decision 582 is made whether the DBLN 1 FLAG is set. If YES, a decision 584 is made whether A1 is eight counts higher than RN2 amplitude (NOTCHED); if yes, an instruction 586 is issued to put F1A1 frequency into RN2. If decision 584 is NO, then an instruction 588 is issued to put RN2 (DIRECT) into RN2 and to set FINE 2 FLAG.

Returning now to decision 582 as to whether the double notch 1 FLAG is set. If NO, then a decision is made whether A1 amplitude (DIRECT) is eight counts higher than RN2 amplitude (DIRECT) by comparing them. If YES, then instruction 586 is issued to put F1A1 into RN2 and exit is made with F2 in RN1, FINE 1 set, and F1 is a new interferer in RN2; if NO, instruction 588 is issued to put RN2 (DIRECT) into RN2 and to set FINE 2 FLAG. Exit is made with F2 in RN1, FINE 1 set, and RN2 at old frequency with FINE 2 set.

Returning now to decision 560 (FIG. 6e) as to whether FINE 2 FLAG is set, if YES, then a decision 592 is made whether F2 is equal to RN2. If YES, a condition 594 exists where F2 is assigned to RN2 and F1 is a new interferer. Next a decision 596 is made whether the double notch FLAG is set. If YES, a decision 598 is made whether A1 amplitude (DIRECT) is eight counts higher than RN1 amplitude (NOTCHED). If YES, an instruction 600 is issued to put F1A1 frequency into RN1; if NO, an instruction 602 is issued to put RN1 frequency (DIRECT) into RN1 and to set FINE 1 FLAG. Returning now to decision 596 as to whether the double notch FLAG is set, if NO, a decision 604 is made whether A1 (DIRECT) is eight counts higher than RN1 (DIRECT) by comparing them. If YES, then instruction 600 is issued to put F1A1 into RN1 and EXIT is made with F2 in RN2, FINE 2 set, and F1 is put into RN1 as a new interferer; if NO, then instruction 602 is issued to put RN1 (DIRECT) into RN1 and to set FINE 1 FLAG. EXIT is made with F2 in RN2, FINE 2 set, and RN1 at old frequency RN1 with FINE 1 FLAG set.

Returning now to decision 592 as to whether F2 is equal to RN2, if NO, a condition 606 exists where F1 is assigned to RN1 and F2 is a new interferer. A decision 608 is made whether the double notch 2 FLAG is set. If YES, a decision 610 is made whether A2 amplitude (DIRECT) is eight counts higher than RN1 amplitude (NOTCHED) by comparing them. If YES, an instruction 612 is issued to put RN1 (DIRECT) into RN1; if NO, an instruction 614 is issued to put RN1 (DIRECT) into RN1 and to set FINE 1 FLAG. Returning to decision 608 as to whether DBLN 2 FLAG is set; if NO, a decision 616 is made whether A2 amplitude (DIRECT) is eight counts higher than RN1 amplitude (DIRECT) by comparing them. If YES, instruction 612 is issued to put RN1 frequency (DIRECT) into RN1 and EXIT is made with F1 in RN2, FINE 2 set, and F2 put into RN1 as a new interferer; if NO, the instruction 614 is issued to put RN1 frequency (DIRECT) into RN1 and to set FINE 1 FLAG. EXIT is made with F1 in RN2, FINE 2 set and RN1 at previous RN1 frequency and FINE 1 FLAG set.

Completion of this routine from any EXIT routes the program to the routine called NOTCH LOOP (FIGS. 6g-6h) which actually tunes the notch filters to the interferer frequency.

Figure 6H:
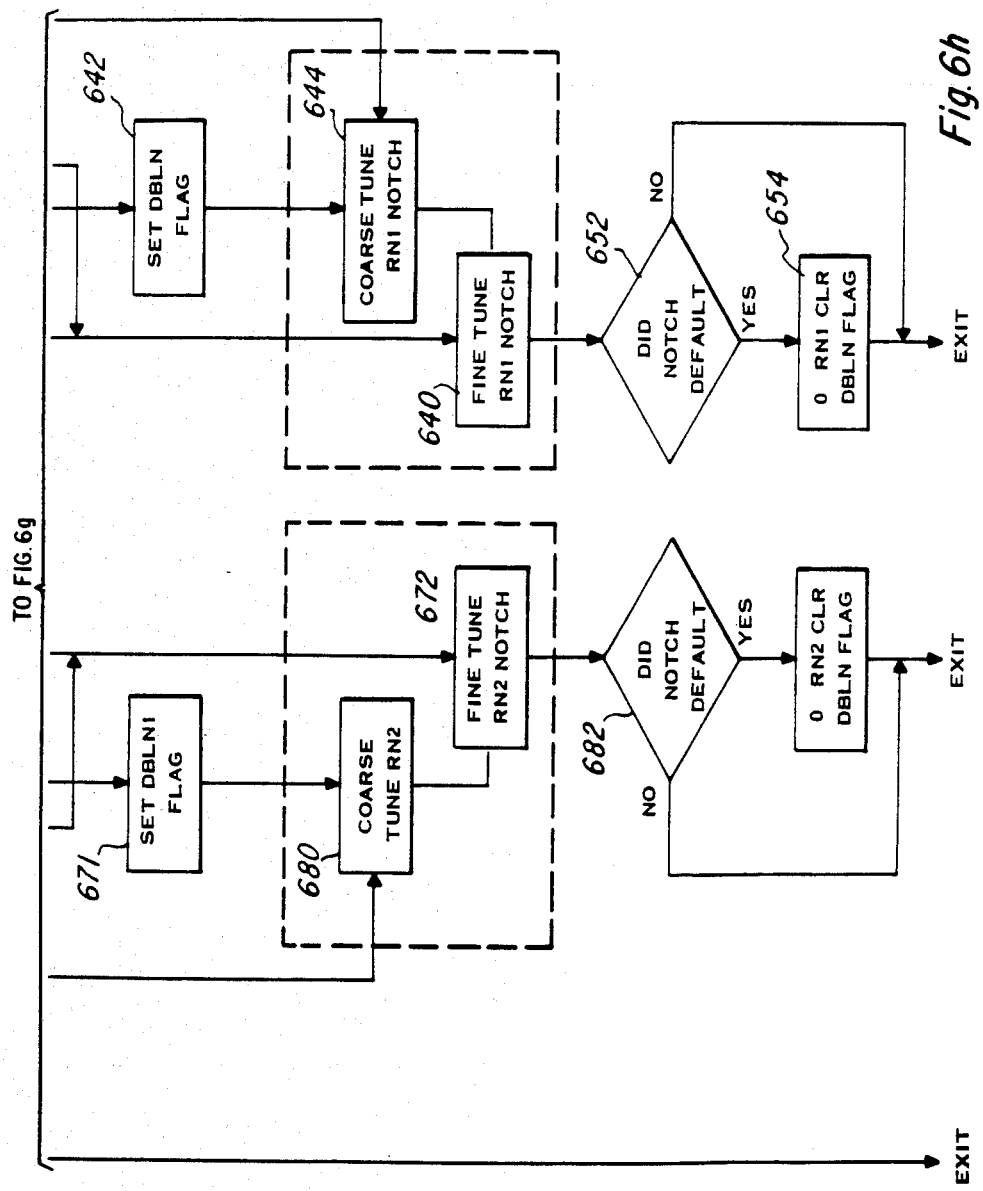

Referring now to FIGS. 6g and 6h for a description of the NOTCH LOOP routine, at START 618 (FIG. 6g) a decision 620 is made whether both RN1 and RN2 frequency equal 0; if YES, EXIT is made with no interferers having been found; if NO, a decision 622 is made whether RN1 amplitude is greater than RN2 amplitude.

If the decision 622 is NO, then a decision is made whether the FINE 2 FLAG is set. If YES, an instruction 626 is issued to FINE TUNE RN2 (NOTCH); if NO, an instruction 628 is issued to coarse tune RN2 prior to issuing instruction 626 to fine tune RN2 (NOTCH). Next, a decision 630 is made whether RN2 (NOTCH) during fine tune defaulted; if NO, then a decision 632 is made whether RN2 amplitude (NOTCHED) is greater than RN1 amplitude (DIRECT); if YES, an instruction 634 is issued to set RN2 frequency to zero prior to making the decision 632. If the decision 632 as to whether RN2 (NOTCHED) amplitude is greater than RN1 (DIRECT) is YES an instruction 636 is issued to place RN2 frequency into RN1 also and a decision 638 made whether the double notch FLAG is set; if YES, an instruction 640 (FIG. 6h) is issued to fine tune RN1 (NOTCH); if NO, an instruction 642 is issued to set the double notch FLAG and an instruction 644 issued to coarse tune RN1 prior to issuing the instruction 640 to fine tune RN1 (NOTCH). Returning to decision 632 (FIG. 6g) as to whether the amplitude of RN2 (NOTCH) is greater than RN1 (DIRECT), if NO, a decision 646 is made whether RN2 frequency is equal to RN1. If the decision 646 is YES, a decision 648 is made whether the FINE 1 FLAG is set; if NO, an instruction 650 is issued to clear the double notch FLAG prior to making the decision 648 as to whether the FINE 1 FLAG is set. If decision 648 is YES, then instruction 640 (FIG. 6h) is issued to FINE TUNE RN1 (NOTCH); if NO, the instruction 644 is issued to coarse tune RN1 prior to issuing the instruction 640 to fine tune RN1 (NOTCH). After FINE TUNE RN1 (NOTCH) 640 a decision 652 is made whether a default occurred during FINE TUNE of RN1 (NOTCH), if NO, EXIT is made, if YES, an instruction 654 is issued to set RN1 to zero and to clear the double notch FLAG.

Returning now to decision 622 (FIG. 6g) whether RN1 amplitude is greater than RN2; if YES, a decision 656 is made whether the FINE 1 FLAG is set. If decision 656 is YES, an instruction 658 is issued to fine tune the RN1 (NOTCH); if NO, an instruction 660 is issued to coarse tune RN1 before issuing the FINE TUNE RN1 (NOTCH) instruction 658.

Next a decision 662 is made whether a default occurred during the fine tuning of RN1 (NOTCH); if NO, a decision 664 is made whether RN1 amplitude (NOTCH) is greater than RN2 (DIRECT); if YES, an instruction 666 is issued to set RN1 equal to zero before making the deicison 664. If decision 664 as to whether the amplitude of RN1 (NOTCH) is greater than RN2 (DIRECT), is YES, an instruction 668 is issued to place the frequency of RN1 into RN2 and a decision 670 is made whether the double notch FLAG is set. If decision 670 is YES, then an instruction 672 (FIG. 6h) is issued to fine tune RN2 notch. If NO, instruction 671 is issued to set the double notch 1 FLAG prior to entering 680 coarse tune. Returning now to decision 664 (FIG. 6g) as to whether the amplitude of RN1 (NOTCHED) is greater than RN2 (DIRECT), if NO, a decision 674 is made whether RN1 is equal to RN2. If decision 674 is YES, then a decision 676 is made whether the FINE 2 FLAG is set; if NO, an instruction 678 is issued to clear the double notch FLAG prior to making the decision 676 as to whether the fine 2 flag is set. If decision 676 is YES, the instruction 672 (FIG. 6h) is issued to fine tune RN2 (NOTCH), if NO, an instruction 680 is issued to coarse tune RN2 prior to issuing the instruction 672 to fine tune RN2 (NOTCH). After fine tuning RN2 (NOTCH) a decision 682 is made whether default occurred during FINE TUNE RN2 (NOTCH), if NO, EXIT is made; if YES, an instruction 684 is issued to set RN2 to zero and to clear the double notch FLAG before EXIT.

EXIT from the notch tuning routine routes the porogram back to the bandscan routine. Thus, the program alternately scans the band and tunes the notches with a period of approximately 30 seconds depending upon the operating conditions.

Although only a single embodiment of this invention has been described herein, it will be apparent to a person skilled in the art that various modifications to the details of construction shown and described may be made without departing from the scope of this invention.

What is claimed is:

1. An automatic interference canceling device comprising:
   a. a RF signal receiver means for receiving RF energy signals;
   b. a programmable notch filter means operatively connected to the RF signal receiver for attenuating a preselected number of interferers in the RF signal band;
   c. a tuneable receiver and amplitude measuring means for scanning the band and determining the presence of interferers and their amplitudes;
   d. an automatic gain control means connected to the tuneable receiver and amplitude measuring means for determining the amplitude of the interferer over a very wide dynamic range;
   e. a multiple switch selectively interconnecting the RF signal receiver means, programmable filter means and tuneable receiver and amplitude measuring means; and
   f. a controller connected to the tuneable receiver and amplitude measuring device, multiple switch and programmable filter means for controlling their operation by selectively activating the switch to connect the tuneable receiver and amplitude measuring device to the RF signal receiver for scanning the band of operation by stepping through a preselected number of frequency increments of the band for determining any interferer present including its amplitude and outputting the information through the automatic gain control means to the controller for storage and determination of a preselected number of worst interferers; and switching in the programmable filter means for filtering these interferers from the RF signals utilizing the gain control level as an indication of relative amplitudes to control the tuning process.

2. An automatic interference canceling device according to claim 1 further including a continuous wave frequency determining means operatively connected to the automatic gain control means for sampling only detected interferers which are continuous wave signals.

3. An automatic interference canceling device according to claim 1 wherein the programmable notch filter means comprises a low and high band filter means a plurality of notch filters each of which includes a programmable attenuator and a biquad filter.

4. An automatic interference canceling device according to claim 3 wherein the programmable attenuator comprises a digital-to-analog converter operatively connected to the controller for converting interfering digital frequency words to analog signals for tuning the notch filters to attenuate interfering frequencies from the desired RF signals.

5. An automatic interference canceling device according to claim 3 wherein said biquad filter includes a light sensitive means and a light generating means in operative association with the light sensitive means, said light sensitive means and light generating means operatively connected to the programmable attenuator and controller for receiving frequency control signals whereby the light from the light generating means controls the light sensitive means to permit high voltage swings without distortion.

6. An automatic interference canceling device according to claim 1 wherein the controller comprises a microprocessor and a digital-to-analog converter means, an output latch means and programmable attenuator's latches operatively connected to the microprocessor, said digital-to-analog converter means including digital-to-analog converters selectively connected to the tuneable receiver and automatic gain control of the tuneable receiver and amplitude measuring means and biquad filters of the programmable notch filter means, said output latch selectively connected to a multiple switch for selectively connecting the RF receiver and programmable notch filter means and additional resistance to the tuneable receiver and amplitude measuring means.

7. An automatic interference canceling device according to claim 1 wherein a signal detector means comprises an antenna and preamplifier and filter means for receiving RF signals in a selected frequency band.

8. An automatic interference canceling apparatus according to claim 2 wherein the continuous wave frequency determining means includes a diode, transistor, capacitor and a comparator, said diode connected to the amplitude measuring means for selectively passing received signals, said transistor, capacitor and comparator connected to the diode, said transistor operative in response to controller means to charge the capacitor to a preselected voltage, permit the capacitor to discharge to the voltage output of the amplitude measuring means, to charge the capacitor again and after a preselected time permit the capacitor to discharge again to ensure the detection of interferers absent any desired frequency pulse signals.

9. An automatic interference cancelling device according to claim 2 wherein the programmable notch filter means, tuneable receiver and amplitude measurement means, automatic gain control, continuous wave frequency determining means and controller are combined in one package for subsequent connection to a RF receiver means.

* * * * *